United States Patent
Finger et al.

(10) Patent No.: US 8,305,398 B2
(45) Date of Patent: Nov. 6, 2012

(54) RENDERING AND COMPOSITING MULTIPLE APPLICATIONS IN AN INTERACTIVE MEDIA ENVIRONMENT

(75) Inventors: James C. Finger, Kirkland, WA (US); John Andre Yovin, Woodinville, WA (US); Khurshed Mazhar, Kirkland, WA (US); Olivier Colle, Redmond, WA (US); Arthur William James Freeman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 11/352,575

(22) Filed: Feb. 13, 2006

(65) Prior Publication Data

US 2007/0002045 A1    Jan. 4, 2007

Related U.S. Application Data

(60) Provisional application No. 60/695,944, filed on Jul. 1, 2005.

(51) Int. Cl.
G09G 5/00       (2006.01)
G06T 15/40      (2011.01)

(52) U.S. Cl. .................. 345/629; 345/421; 345/422

(58) Field of Classification Search .......... 345/631, 345/637
See application file for complete search history.

(56) References Cited

U.S. PATENT DOCUMENTS

| | | | |
|---|---|---|---|
| 5,195,092 A | 3/1993 | Wilson et al. | |
| 5,208,745 A | 5/1993 | Quentin et al. | |
| 5,452,435 A | 9/1995 | Malouf et al. | |
| 5,515,490 A | 5/1996 | Buchanan et al. | |
| 5,608,859 A | 3/1997 | Taguchi | |
| 5,631,694 A | 5/1997 | Aggarwal et al. | |
| 5,694,560 A * | 12/1997 | Uya et al. ................. | 715/781 |
| 5,760,780 A | 6/1998 | Larson et al. | |
| 5,794,018 A | 8/1998 | Vrvilo et al. | |
| 5,877,763 A | 3/1999 | Berry | |
| 5,966,121 A | 10/1999 | Hubbell et al. | |
| 5,995,095 A | 11/1999 | Ratakonda | |
| 6,067,638 A | 5/2000 | Benitz et al. | |
| 6,069,633 A | 5/2000 | Apparao et al. | |
| 6,100,881 A | 8/2000 | Gibbons et al. | |

(Continued)

FOREIGN PATENT DOCUMENTS

CA     2340144 A1     9/2001

(Continued)

OTHER PUBLICATIONS

Ben Willmore, "Adobe Photoshop CS Studio Techniques", Pub Feb. 11, 2004, Safari Online Books, Ch. 3 Section titled "Layers Primer", pp. 104-110, Adobe Press.*

(Continued)

Primary Examiner — Daniel Hajnik
(74) Attorney, Agent, or Firm — Mayer & Williams PC

(57) ABSTRACT

In an interactive media environment, a model is provided where applications, each comprising zero or more script components and zero or more markup components, are themselves handled as visual elements having a Z order. A resource-efficient rendering order is provided where the application that has focus in an interactive media environment (by virtue of its receipt of user events) is rendered first. The remaining applications are rendered in top down order, i.e., in reverse Z order. Rendering is performed by drawing into one or more graphics buffers associated with respective applications. Frames for applications are composited from the graphics buffers bottoms up, in Z order, to provide the display with the correct appearance.

20 Claims, 15 Drawing Sheets

U.S. PATENT DOCUMENTS

| Patent No. | Date | Inventor(s) | Cite |
|---|---|---|---|
| 6,212,595 B1 | 4/2001 | Mendel | |
| 6,369,830 B1* | 4/2002 | Brunner et al. | 345/629 |
| 6,384,846 B1* | 5/2002 | Hiroi | 715/794 |
| 6,426,778 B1 | 7/2002 | Valdez | |
| 6,430,570 B1 | 8/2002 | Judge et al. | |
| 6,442,658 B1 | 8/2002 | Hunt et al. | |
| 6,453,459 B1 | 9/2002 | Brodersen et al. | |
| 6,577,341 B1 | 6/2003 | Yamada et al. | |
| 6,628,283 B1* | 9/2003 | Gardner | 345/427 |
| 6,629,150 B1 | 9/2003 | Huded | |
| 6,642,939 B1 | 11/2003 | Vallone et al. | |
| 6,665,835 B1 | 12/2003 | Gutfreund et al. | |
| 6,700,588 B1* | 3/2004 | MacInnis et al. | 345/629 |
| 6,785,729 B1 | 8/2004 | Overby et al. | |
| 6,906,643 B2 | 6/2005 | Samadani et al. | |
| 6,920,613 B2 | 7/2005 | Dorsey et al. | |
| 6,925,499 B1 | 8/2005 | Chen et al. | |
| 7,120,859 B2 | 10/2006 | Wettach | |
| 7,131,143 B1 | 10/2006 | LaMacchia et al. | |
| 7,200,357 B2 | 4/2007 | Janik et al. | |
| 7,210,037 B2 | 4/2007 | Samar | |
| 7,222,237 B2 | 5/2007 | Wuidart et al. | |
| 7,290,263 B1 | 10/2007 | Yip et al. | |
| 7,376,910 B2* | 5/2008 | Inui et al. | 715/797 |
| 7,496,845 B2 | 2/2009 | Deutscher et al. | |
| 2001/0054180 A1 | 12/2001 | Atkinson | |
| 2002/0038257 A1 | 3/2002 | Joseph et al. | |
| 2002/0091837 A1 | 7/2002 | Baumeister et al. | |
| 2002/0099738 A1 | 7/2002 | Grant | |
| 2002/0118220 A1 | 8/2002 | Lui et al. | |
| 2002/0138593 A1 | 9/2002 | Novak et al. | |
| 2002/0157103 A1 | 10/2002 | Song et al. | |
| 2002/0170005 A1 | 11/2002 | Hayes | |
| 2002/0188616 A1 | 12/2002 | Chinnici et al. | |
| 2003/0026398 A1 | 2/2003 | Duran et al. | |
| 2003/0076328 A1* | 4/2003 | Beda et al. | 345/503 |
| 2003/0142137 A1 | 7/2003 | Brown | |
| 2003/0152904 A1 | 8/2003 | Doty, Jr. | |
| 2003/0174160 A1 | 9/2003 | Deutscher et al. | |
| 2003/0182364 A1 | 9/2003 | Large et al. | |
| 2003/0182624 A1 | 9/2003 | Large | |
| 2003/0187801 A1 | 10/2003 | Chase | |
| 2003/0204511 A1 | 10/2003 | Brundage et al. | |
| 2003/0204613 A1 | 10/2003 | Hudson et al. | |
| 2003/0210270 A1 | 11/2003 | Clow | |
| 2004/0001706 A1 | 1/2004 | Jung et al. | |
| 2004/0027259 A1 | 2/2004 | Soliman et al. | |
| 2004/0034622 A1 | 2/2004 | Espinoza et al. | |
| 2004/0034795 A1 | 2/2004 | Anderson et al. | |
| 2004/0039834 A1 | 2/2004 | Saunders et al. | |
| 2004/0049793 A1 | 3/2004 | Chou | |
| 2004/0068510 A1 | 4/2004 | Hayes et al. | |
| 2004/0107179 A1 | 6/2004 | Dalrymple, III | |
| 2004/0107401 A1 | 6/2004 | Sung et al. | |
| 2004/0111270 A1 | 6/2004 | Whitham | |
| 2004/0123316 A1 | 6/2004 | Kendall et al. | |
| 2004/0143823 A1 | 7/2004 | Wei | |
| 2004/0148514 A1 | 7/2004 | Fee et al. | |
| 2004/0153648 A1 | 8/2004 | Rotholtz et al. | |
| 2004/0153847 A1 | 8/2004 | Apte et al. | |
| 2004/0156613 A1 | 8/2004 | Hempel et al. | |
| 2004/0187157 A1 | 9/2004 | Chong et al. | |
| 2004/0190779 A1 | 9/2004 | Sarachik et al. | |
| 2004/0205478 A1 | 10/2004 | Lin et al. | |
| 2004/0205479 A1 | 10/2004 | Seaman et al. | |
| 2004/0210824 A1 | 10/2004 | Shoff et al. | |
| 2004/0220926 A1 | 11/2004 | Lamkin et al. | |
| 2004/0228618 A1 | 11/2004 | Yoo et al. | |
| 2004/0243927 A1 | 12/2004 | Chung et al. | |
| 2004/0247292 A1 | 12/2004 | Chung et al. | |
| 2004/0250200 A1 | 12/2004 | Chung et al. | |
| 2004/0267952 A1 | 12/2004 | He et al. | |
| 2004/0268224 A1 | 12/2004 | Balkus | |
| 2005/0015815 A1 | 1/2005 | Shoff et al. | |
| 2005/0022116 A1 | 1/2005 | Bowman et al. | |
| 2005/0088420 A1 | 4/2005 | Dodge et al. | |
| 2005/0091574 A1 | 4/2005 | Maaniitty et al. | |
| 2005/0125741 A1 | 6/2005 | Clow | |
| 2005/0132266 A1 | 6/2005 | Ambrosino et al. | |
| 2005/0140694 A1 | 6/2005 | Subramanian et al. | |
| 2005/0149729 A1 | 7/2005 | Zimmer et al. | |
| 2005/0183016 A1 | 8/2005 | Horiuchi et al. | |
| 2005/0251732 A1 | 11/2005 | Lamkin et al. | |
| 2005/0289348 A1 | 12/2005 | Joy | |
| 2006/0020950 A1 | 1/2006 | Ladd et al. | |
| 2006/0041522 A1 | 2/2006 | Rodriguez-Rivera | |
| 2006/0140079 A1 | 6/2006 | Hamada et al. | |
| 2006/0274612 A1 | 12/2006 | Kim | |
| 2007/0002045 A1 | 1/2007 | Finger et al. | |
| 2007/0005757 A1 | 1/2007 | Finger et al. | |
| 2007/0005758 A1 | 1/2007 | Hughes, Jr. et al. | |
| 2007/0006061 A1 | 1/2007 | Colle et al. | |
| 2007/0006063 A1 | 1/2007 | Jewsbury et al. | |
| 2007/0006078 A1 | 1/2007 | Jewsbury et al. | |
| 2007/0006079 A1 | 1/2007 | Hayes et al. | |
| 2007/0006080 A1 | 1/2007 | Finger et al. | |
| 2007/0006233 A1 | 1/2007 | Finger et al. | |
| 2007/0006238 A1 | 1/2007 | Finger et al. | |
| 2007/0033419 A1 | 2/2007 | Kocher et al. | |
| 2007/0174387 A1 | 7/2007 | Jania et al. | |
| 2007/0198834 A1 | 8/2007 | Ksontini et al. | |
| 2007/0277245 A1 | 11/2007 | Goto et al. | |
| 2008/0126199 A1 | 5/2008 | Fawcett et al. | |
| 2009/0007160 A1 | 1/2009 | Wei | |

FOREIGN PATENT DOCUMENTS

| | | |
|---|---|---|
| EP | 1345119 | 9/2003 |
| EP | 1345119 A | 9/2003 |
| EP | 1551027 A1 | 7/2005 |
| EP | 1641259 A1 | 3/2006 |
| GB | 2344925 A | 6/2000 |
| JP | 2000-098999 A | 4/2000 |
| JP | 2004-221900 A | 8/2004 |
| WO | 0217179 A1 | 2/2002 |
| WO | 02/091178 | 11/2002 |
| WO | 02091178 A | 11/2002 |
| WO | 03077249 A1 | 9/2003 |
| WO | 2004025651 A1 | 3/2004 |
| WO | 2005002219 A1 | 1/2005 |
| WO | 2005020236 A1 | 3/2005 |
| WO | 2005048261 A1 | 5/2005 |
| WO | 2005052940 A1 | 6/2005 |

OTHER PUBLICATIONS

Non Final Office Action for U.S. Appl. No. 11/405,736, dated May 18, 2009, 12 pages.

Cesar et al., "Open Graphical Framework for Interactive TV", IEEE Fifth International Symposium on Multimedia Software Engineering (ISMSE'03) p. 21, accessed at http://doi.ieeecomputersociety.org/10.1109/MMSE.2003.1254418 on Sep. 20, 2005.

Apple, Compressor 2 User Manual, Apr. 25, 2005, Apple, select pages (3 in total).

Apple, Final Cut Pro 5 User Manual, May 11, 2005, Apple, select pages (73 in total).

International Search Report for PCT/US06/23905 of Jun. 20, 2006, 7 pages.

Non-Final Office Action for U.S. Appl. No. 11/355,209, dated May 15, 2009, 12 pages.

International Search Report for PCT/US06/23911, mailed on Jun. 3, 2008, 8 pages.

International Search Report for PCT/US2006/024155, dated Feb. 26, 2007, 8 pages.

International Search Report for PCT/US2006/023906, dated Nov. 20, 2006, 6 pages.

International Search Report for PCT/US06/24034, dated Jun. 20, 2008, 10 pages.

International Search Report for PCT/US2006/023907, dated Mar. 2, 2007, 7 pages.

International Search Report for PCT/US2006/024226 dated Jun. 22, 2006, 7 pages.

Non Final Office Action for U.S. Appl. No. 11/405,737, dated May 18, 2009, 11 pages.

Non Final Office Action for U.S. Appl. No. 11/354,800, dated Sep. 13, 2007, 8 pages.

Non Final Office Action for U.S. Appl. No. 11/355,609, dated Jun. 5, 2009, 12 pages.
Non Final Office Action for U.S. Appl. No. 11/350,595, dated Jun. 26, 2009, 4 pages.
Non Final Office Action for U.S. Appl. No. 11/351,085, dated Jun. 1, 2009, 14 pages.
Non Final Office Action for U.S. Appl. No. 11/354,800, dated Jul. 15, 2008, 7 pages.
Final Office Action for U.S. Appl. No. 11/354,800, dated May 1, 2009, 8 pages.
Non Final Office Action for U.S. Appl. No. 11/352,662, dated Jun. 2, 2009, 12 pages.
Anderson et al., "Building multiuser interactive multimedia environments at MERL", Multimedia, IEEE vol. 2, Issue 4, Winter 1995 pp. 77-82, accessed at http://ieeexplore.ieee.org/search/wrapper.jsp?arnumber=482298 on Sep. 30, 2005.
Borchers et al., "Musical Design Patterns: An Example of a Human-Centered Model of Interactive Multimedia", 1997 International Conference on Multimedia Computing and Systems (ICMCS'97) p. 63, accessed at http://doi.ieeecomputersociety.org/10.1109/MMCS.1997.609564 on Sep. 30, 2005.
Fritzsche, "Multimedia Building Blocks for Distributed Applications", 1996 International Workshop on Multimedia Software Development (MMSD '96) p. 0041, accessed at http://doi.ieeecomputersociety.org/10.1109/MMSD.1996.557742 on Sep. 30, 2005.
International Search Report for PCT/US2006/024294 dated Apr. 30, 2007, 7 pages.
International Search Report for PCT/US2006/024423 dated Apr. 24, 2007, 5 pages.
International Search Report for PCT/US2006/024292 dated May 7, 2007, 7 pages.
C. Peng et al., "Digital Television Application Manager", Telecommunications Software and Multimedia Laboratory, Helsinki University of Technology, 2001 IEEE International Conference on Multimedia and Expo, 4 pages.
Non Final Office Action for U.S. Appl. No. 11/352,571, dated May 18, 2009, 7 pages.
Final Office Action dated Jan. 22, 2010 in related U.S. Appl. No. 11/350,595. 6 pages.
Final Office Action dated Dec. 11, 2009 in related U.S. Appl. No. 11/355,209, 16 pages.
Evans, Mark, "Lambda the Ultimate" Sep. 7, 2003, DP-COOL 2003 Proceedings, lambda-the-ultimate.org/classic/message8639.html.
Final Office Action dated Jan. 11, 2010 in related U.S. Appl. No. 11/352,662, 13 pages.
Non-Final Office action dated Oct. 8, 2009 in related U.S. Appl. No. 11/354,800, 18 pages.
Final Office Action dated Nov. 27, 2009 in related U.S. Appl. No. 11/405,737, 12 pages.
Final Office Action dated Dec. 10, 2009 in related U.S. Appl. No. 11/405,736, 14 pages.
Final Office Action dated Jan. 25, 2010 in related U.S. Appl. No. 11/351,085, 14 pages.
International Multimedia Conference; vol. 9 Proceedings of the Ninth ACM International Conference on Multimedia, Poellauer, Schwan, West, pp. 231-240, 2001.
Final Office Action dated Dec. 1, 2009 in related U.S. Appl. No. 11/352,571, 9 pages.
Z-Order Correction Algorithm for Dialog Boxes, IBM Technical Disclosure Bulletin, IBM Corp. New York, US, vol. 37, No. 8, Aug. 1, 1994.
International Search Report for PCT/US06/24292 dated May 7, 2007, 1 page.
Author Unknown, MHP Project Office: "Digital Video Broadcasting (DVB); Multimedia Home Platform (MHP) Specification 1.1.2" Apr. 25, 2005, part 1, 405 pages.
Author Unknown, MHP Project Office: "Digital Video Broadcasting (DVB); Multimedia Home Platform (MHP) Specification 1.1.2" Apr. 25, 2005, part 2, 405 pages.
Author Unknown, MHP Project Office: "Digital Video Broadcasting (DVB); Multimedia Home Platform (MHP) Specification 1.1.2" Apr. 25, 2005, part 3, 362 pages.
Peng et al. "Digital Television Application Manager" 2001 IEEE International Conference on Multimedia and Expo, pp. 685-688.
Benekidt, M. et al., "Managing XML Data: An Abridged Overview", Computing in Science and Engineering, IEEE Service Center, Los Alamitos, CA, US, vol. 6, No. 4, Jul. 1, 2004, pp. 12-19.
Barton C. et al., "Streaming XPath processing with forward and backward axes", Proceedings 19th International Conference on Data Engineering, Bangalore, India, Conf. 19, Mar. 5, 2003, p. 455-466.
Pihkala K. et al., "Design of a Dynamic Smil Player", Multimedia and Expo, 2002, ICME '02 Proceedings. 2002 IEEE International Conference on Lausanne, Switzerland, Aug. 26-29, 2002, Piscataway, NJ, USA, vol. 2, Aug. 26, 2001, pp. 189-192.
Blu-Ray Disc: "White paper Blu-ray Disc Format. 2.B Audip Visual Application Format Specifications for BD-ROM", Internet Citatuion, Mar. 2005, http://www.blu-raydisc.com/assets/downloadablefile/2b_bdrom_audiovisualapplication_0305-12955-13403.pdf.
Juliana Freire, et al., "Managing XML Data: An Abridged Overview", Computing in Science & Engineering, 2004 IEEE.

* cited by examiner

RENDERING AND COMPOSITING MULTIPLE APPLICATIONS IN AN INTERACTIVE MEDIA ENVIRONMENT

STATEMENT OF RELATED APPLICATION

This application claims the benefit of provisional application No. 60/695,944, filed Jul. 1, 2005, which is incorporated by reference herein.

TECHNICAL FIELD

The described arrangements, systems and methods relate generally to interactive media and more particularly to rendering and compositing multiple applications in an interactive media environment.

BACKGROUND

Interactive media environments are typically resource constrained in terms of available processing power, memory and other resources that are available to applications running in the environment. One common example of interactive media is video encoded on DVD (digital versatile disc) where users can interact with graphical menus or other controls to navigate to specific video content or invoke special features that are authored into the DVD.

In a typical interactive media environment, visual elements such as graphics and menus are given a "Z order" that provides a visual order for the elements on a display screen. The Z order controls how visual elements appear to stack on top of one another along an imaginary z-axis which extends outwardly from the display screen. Visual elements with a lower Z order appear to be at the bottom of display (and farther away from a viewer) while visual elements with a higher Z order appear to be on top of the lower Z ordered elements (and thus closer to the viewer).

Generally, when rendering the visual elements for display, the lower Z ordered elements are drawn first followed by higher Z ordered elements. The higher Z ordered visual elements will then be drawn over and may occlude portions or all of the lowered Z ordered elements. In this way, the display appears correctly with the visual elements in the stack having proper overlap and relative order. However, such methodology forces resources to be focused on the bottom most visual elements (because they are drawn first) which can be inefficient. Processing power is wasted in drawing low Z ordered visual elements even when such elements end up being occluded by the higher Z ordered elements in the completely drawn scene. Such inefficiency can overtax system resources and lead to undesirable player behavior such as disruptions in video playback and the synchronization between video and graphics in the environment.

SUMMARY

In an interactive media environment, a model is provided where applications, each comprising zero or more script components and zero or more markup files, are themselves handled as visual elements having a Z order. A rendering order is utilized where the application that has focus in an interactive media environment (by virtue of its receipt of user events) is rendered first. Then the remaining applications are rendered in top down order, i.e., in reverse Z order. Rendering is performed by drawing into one or more graphics buffers associated with respective applications. Frames for applications are composited from the graphics buffers bottoms up, in Z order, to provide the display with the correct appearance.

In various illustrative examples, a navigation manager in a playback system maintains Z order for applications running on the playback system. A presentation engine draws applications into a canvas object in an application's markup that is rendered, by application, in reverse Z order into respective graphics buffers. A graphics rendering engine composites frames from the graphics buffers, by application, in Z order using the Painter's Algorithm. An application may also invoke methods to punch through applications stacked above it (i.e, having higher Z order) to visually lift an applications visual elements from the bottom of the stack, or push elements down lower in the display.

Advantageously, rendering applications into graphics buffers in reverse Z order followed by compositing the display in Z order provides a resource-efficient model in an environment where hardware resources, including processor cycles and memory, are generally limited. A more natural priority is given to the focused application and higher Z ordered applications so that fewer resources are expended in drawing lower Z ordered visual elements that may end up being drawn over and occluded.

DETAILED DESCRIPTION

Figure 1:
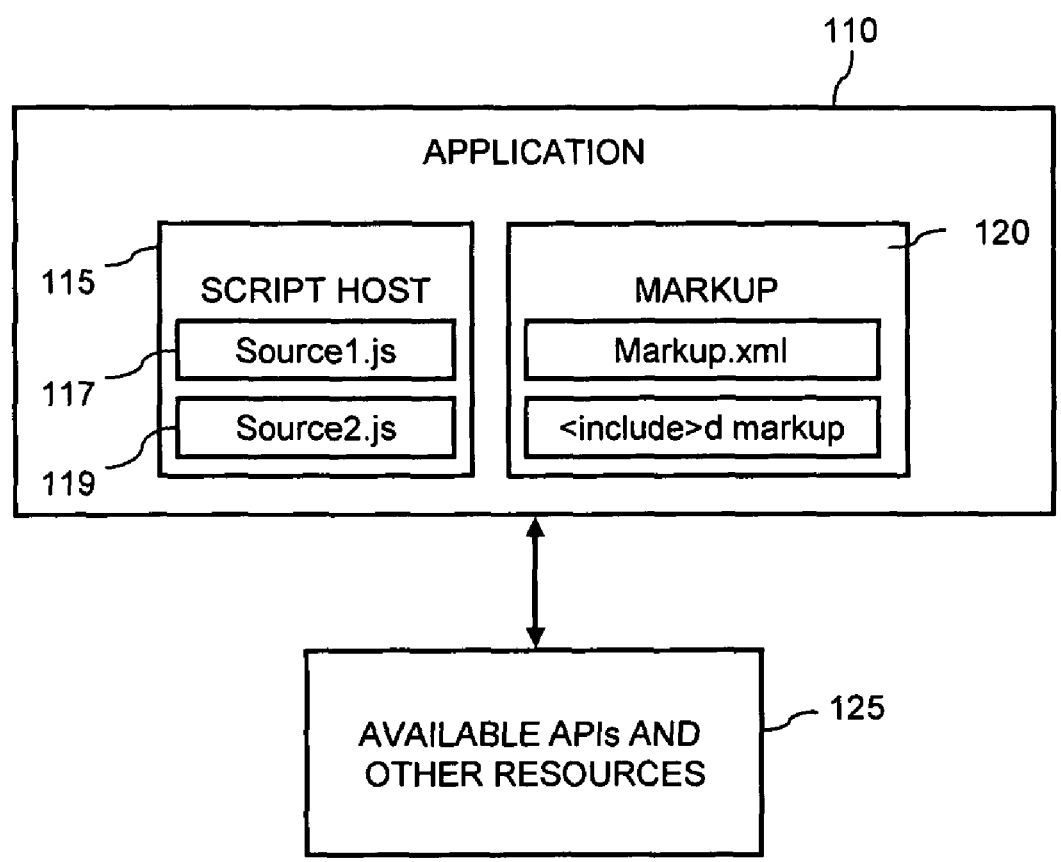
FIG. 1 is an illustrative block diagram showing the elements making up an application used in an interactive media environment.

Referring to FIG. 1, an illustrative block diagram of the elements making up an application 110 used in an interactive media environment is shown. Applications are typically used in the interactive media environment to enable interaction between a user and an interactive media player rendering graphics and video on a coupled display device (such as a television or monitor) through a user interface such as a remote control. More specifically, applications control presentation behavior of various content objects, including video playback, in the environment. Presentation of graphic objects such as menus and interactive buttons over the video is also realized using applications. Applications further manage and control audio playback and sounds in the environment. It is contemplated that multiple applications will generally be running simultaneously in most interactive media settings. However, there is no requirement the multiple applications run simultaneously and the decision to divide or aggregate applications in a particular setting is a design choice of the interactive media author. Applications may also be logically subdivided into application pages depending on the requirements of a specific setting.

The application 110 comprises a script host 115 containing zero or more script files 117 and 119 and zero or more markup documents 120 that is used to generate a document object model (DOM). The markup documents 120 include information relating, for example, to content, style, timing and layout of graphic objects. Thus, the markup context is used generally to provide graphics on a graphics plane in the interactive media environment.

In this illustrative example, the markup documents are XML document files in accordance with W3C standards. As indicated in FIG. 1, multiple physical XML files may be accessed using the <include> element in the <head> section of the markup. In some settings it may be preferable for an application to not have more than one active markup at a time. However, an application may switch its markup 120 by using a <link> element in the markup. Alternatively, an application may switch its markup 120 by utilizing an application programming interface (API) that enables applications to gain access to functional objects within a current application. Using a loadMarkup ( ) call through the API, an application may switch markup files 120 by passing the Uniform Resource Identifier (URI) of the new markup through an API.

In cases where an application accesses a new markup, the API call takes effect only after a current event handler in the application finishes executing its current task. Any current markup-related event handlers that are pending are also cancelled as the new markup, once loaded, will invalidate those event handlers.

In this illustrative example, script host 115 contains script files 117 and 119 which are used along with the markup 120 to implement interactive media experiences. Script files 117 and 119 may be implemented, for example, using ECMAScript as defined by Ecma International in the ECMA-262 specification. Common scripting programming languages falling under ECMA-262 include JavaScript and JScript. In some settings, it may be desirable to implement scripts 117 and 119 using a subset of ECMAScript 262, in particular ECMA-327, along with a host environment and a set of common APIs. Script context in most settings is utilized to deal with interactive control issues from user along with system events, graphics control, video playback, resource management (e.g. use of caching or persistent store resources) and other issues that are not readily or efficiently implemented using solely markup 120.

The availability of APIs and resources to application 110 is indicated by reference numeral 125 in FIG. 1. Resources include, for example, audio and video files, fonts, pictures and images (e.g., in common file formats including PNG, JPEG, GIF, BMP, TIFF etc.) and other resources as may be required by an application according to the circumstances of a specific setting.

Each application 110 maintains its own script host 115 that maintains the context for the script's variables, functions and other states. In most settings, variables and functions in one application are not visible to another application unless the applications are specifically set up to enable such cross-application visibility, for example, by using an object that is shared across all applications. For example, in this illustrative example, the interactive media player object has a single instance that is shared across all applications. Optionally, therefore, special objects may be placed inside script host 115—for example, using a C++ object—to implement singletons (i.e., a objects having limited instantiation) where the special objects all reference the same internal function, for example, of the player. This optional aspect enables interactive media script authors to logically treat common objects as singletons while still allowing the script host 115 to implement the functionality necessary to expose an object to the single script host.

Figure 2:
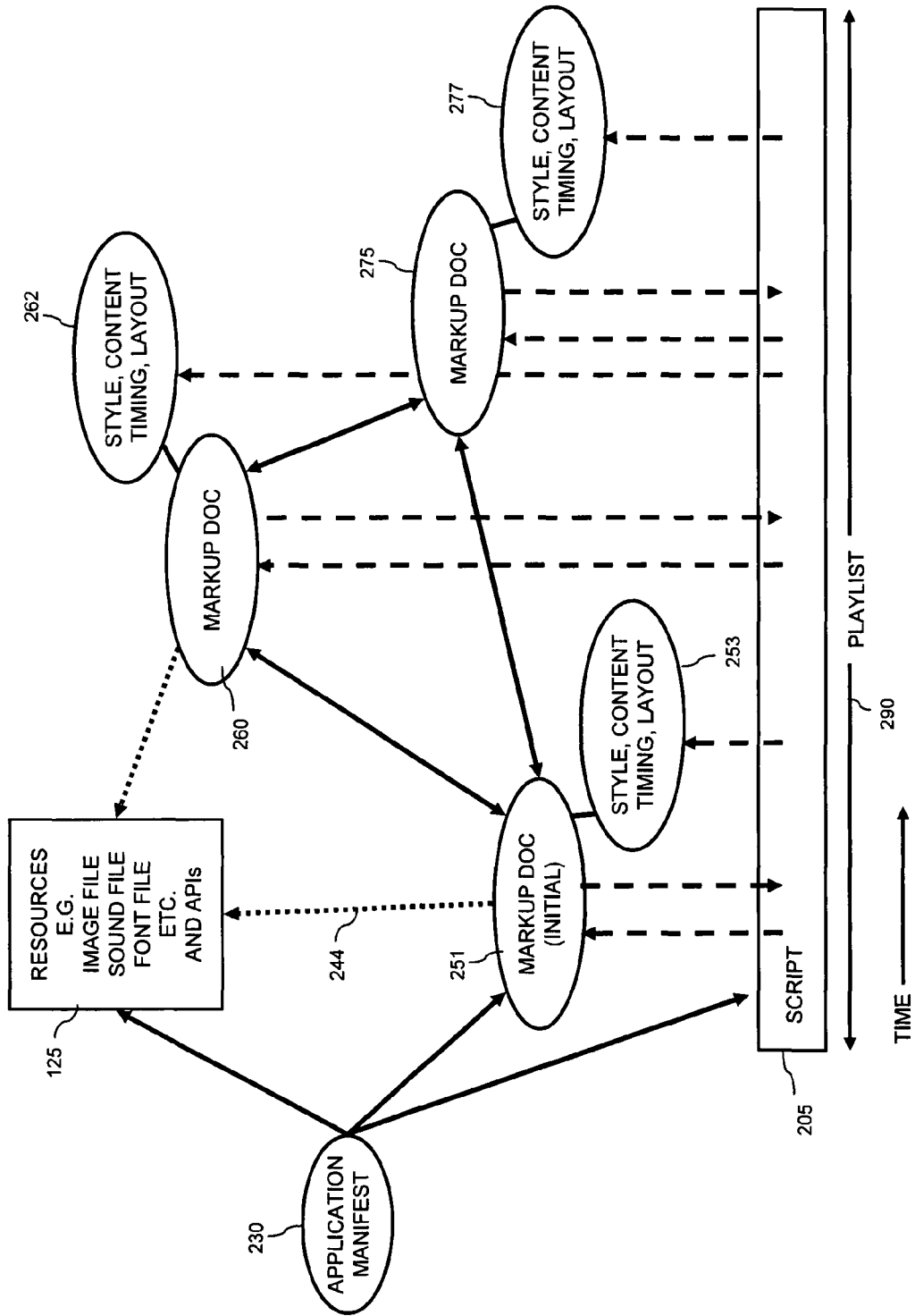
FIG. 2 is an illustrative diagram which shows the relationship among multiple markup documents and script.

Referring now to FIG. 2, an illustrative diagram showing the relationship among multiple markup documents and script is provided. An application manifest 230 interacts with applications which, as noted above, are defined generally by resources 125, script 205, and markup documents 251, 260 and 275 as shown. Each application typically uses a single application manifest file in most settings, but the application manifest is not part of the runtime state of the application. In this illustrative example, the application manifest 230 is encoded as an XML document file.

The application manifest 230 describes the initial markup file 251 to be used by the application 110 (FIG. 1) as well as the script files—collectively indicated by the rectangle with reference numeral 205 in FIG. 2—contained in script host 115 (FIG. 1). If the application manifest 230 lists more than one script, as in this illustrative example, then all the scripts are loaded into a script handling engine in the interactive media player. Thus, the multiple script files are treated and behave as if the script author had concatenated all of the script files into a single large file in the order listed in the application manifest 230.

As shown in FIG. 2, the application manifest 230 refers to resources 125. The resources available to an application in an interactive media environment form a directed graph, rooted by the resources 125 referenced in the application manifest 230. The allowed extent of the graph for each application is proscribed by the application manifest 230.

FIG. 2 shows an application running in the interactive media environment. As noted above, an application may only have one active markup at a time and application content is kept separate by the applications. As indicated by the arrows between the markup pages 251, 260 and 275, via script 205, the application is able to advance from markup page 251 to 260, and then later from page 260 to 275.

The progression of context execution by applications in the interactive media environment is guided by a playlist 290 which describes, among other things, the relationship among objects in the environment including presentation objects that are rendered by the player onto the display device. These presentation objects typically include video (which may include multiple streams as described in more detail below) and graphics produced by the applications.

Playlist 290 further manages resources across the interactive media environment as a single management entity in order to efficiently allocate and control the consumption of resources by applications. As with the application manifest 230 the playlist 290 may be advantageously embodied as an XML document file in most settings.

The markup pages in FIG. 2 may be used in some settings to fire events into an execution context (created by the script files 117 and 119 in FIG. 1). The execution context then manipulates the DOM created by the current application markup. As the markup is used in the interactive media environment to specify style, content, timing and layout of graphical objects in the environment (as represented by elements 253 262 and 277 in FIG. 2), the combination of script and markup enables the creation of a comprehensive set of capabilities.

Figure 3:
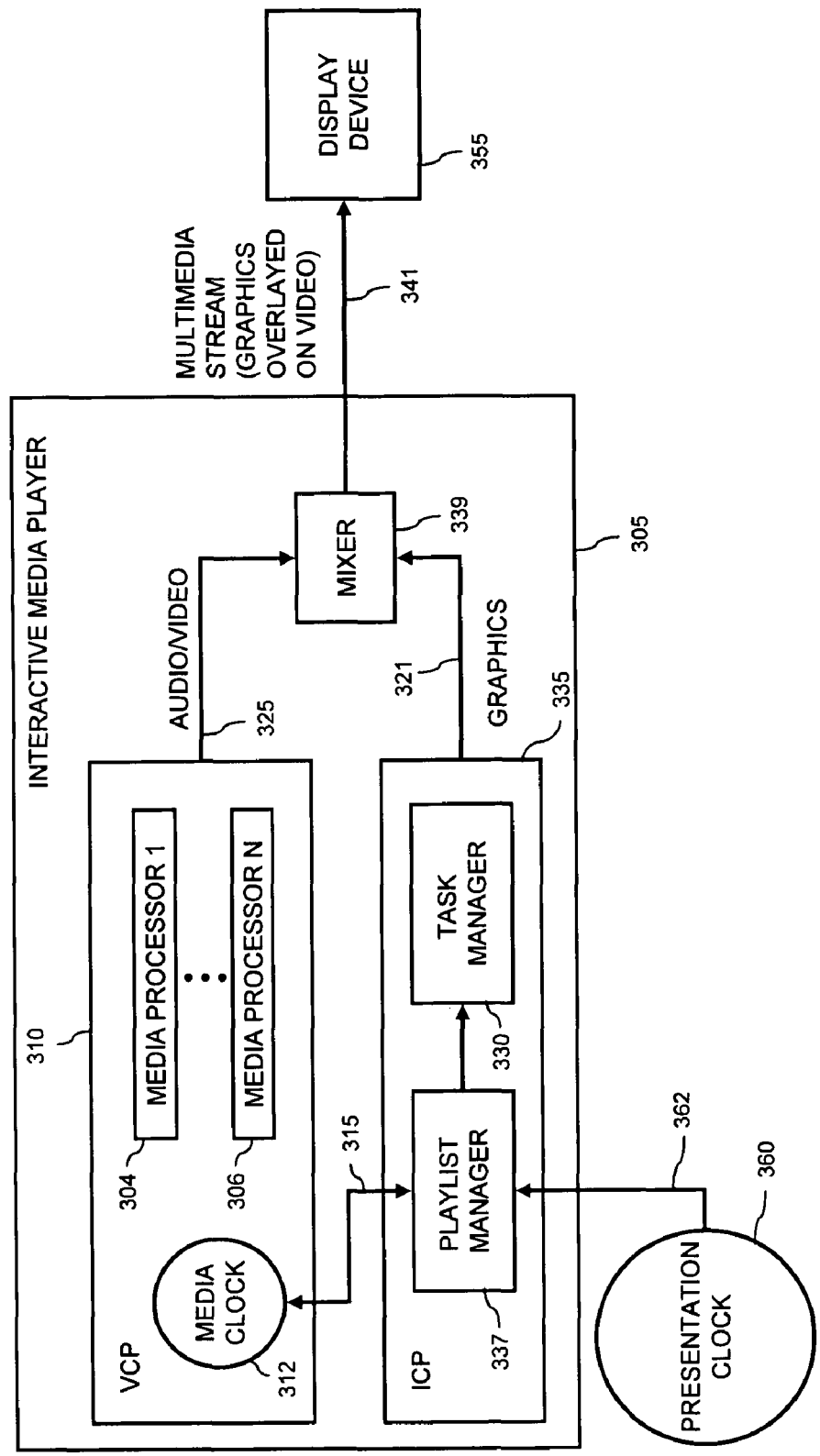
FIG. 3 is a block diagram of an illustrative interactive media player including an interactive content processor, a video content processor and a mixer.

FIG. 3 is a block diagram of a first illustrative interactive media player 305 including an interactive content processor (ICP) 335, video content processor (VCP) 310, and mixer 339. It is noted that the arrangement presented in FIG. 3 provides a logical model which describe features and functions of the illustrative interactive media player 305 that are pertinent to application state management. Thus, an actual implementation of an interactive media player may utilize various structural forms while still operating as described herein to achieve the benefits of application state management. The interactive media player 305 is typically realized in dedicated hardware such as standalone consumer electronic device, or alternatively using a software implementation employing computer readable media with a general purpose processor such as that found in a personal computer.

VCP 310 manages one or more media streams that may be received from multiple sources including a local optical drives such as a DVD drive or a high-definition DVD (HD-DVD) drive, a local memory or a remote broadband source over a network. VCP 310, in this illustrative example, includes one or more media processors 1, 2 . . . N as indicated by elements 304 and 306 in FIG. 3. Media processors 304 and 306 process the received media streams, which typically include audio and video, to decode and render the corresponding images and sound which are output as an audio/video stream on line 325. Audio/video stream 325 may represent a plurality of video elements, for example to render multiple separate video windows using a "picture in picture" type configuration.

Media processors 304 and 306 each comprise a media source interface, demultiplexer and decoder. Media processors 304 and 306 may optionally include decryption capabilities as well. A display device 355 is coupled to receive and display the audio/video stream.

A media clock 312 is utilized so that each received media has an associated "Media Time." When a video stream is paused on the interactive media player 305 then the media clock 312 is paused as well. When the video stream is set by a user to go faster or slower than real time (for example, when the video is put into fast forward, rewind or slow-motion modes—using any of these modes is referred to as "trick play"), then the media clock 312 speeds up or slows down accordingly. The Media Time is thus derived from the media clock and the operation of the media processors 304 and 306. The Media Time is passed to the playlist manager 337 in ICP 335 over line 315. Time in the interactive media environment, including Media Time, is typically counted in units of "ticks."

ICP 335 performs all application-related processing and may be arranged from several components that may be realized in hardware, software, firmware or a combination thereof. The components of ICP 335 include, for example, a markup engine, script language interpreter, and an XML parsing component (not shown). ICP 335 outputs a graphics stream on line 321 which is synchronous with the audio/video stream 325. Mixer 339 takes the graphics stream on line 321 and the audio/video stream on line 325 so that the graphics are rendered in a graphics layer over the video stream to implement an interactive media session for a user.

In most settings, ICP 335 outputs graphics that are synchronized on a frame-by-frame basis with the video stream. However, such synchronization may be performed using other bases, including, for example, time (including Title Time and Media time as defined below), content in the video, or other metadata embedded in the video that is used to indicate or mark a particular point in the stream.

ICP 335 includes a playlist manager 337 and a task manager 330. The playlist manager 337 is responsible for controlling presentation objects in the environment. These objects include video playback on the player 305 along with applications that are running to generate interactive graphics. Playlist manager 337 manages the playlist 290 which is described above in the text accompanying FIG. 2.

The playlist manager 337 also computes the "Title Time" associated with each portion of content in a media stream. A title is a unique sequence of video and audio content with a start and end time that is typically defined by the DVD author. However, what such author defines as a title can be arbitrary. Thus, particular content which is perceived in a video may be part of one title, a complete title, or run across multiple titles.

One example of a title is the copyright warning that precedes all pre-recorded video in both analog and digital format in the United States. The featured attraction (e.g., the main movie) on a DVD is another example and is often the longest title. In some settings, individual chapters in a movie might be designated as separates titles by the DVD author. For all such titles, Title Time is defined as the time elapsed since a given title started playing as shown on the media clock 312.

A presentation clock 360 is coupled to the playlist manager on line 362. The presentation clock 360 is a clock whose time changes at the same pace as a real-world clock (i.e., it takes one second of real time for the presentation clock 360 to advance by one second). In contrast to the media clock 312, the presentation clock 360 never stops and cannot be sped up or slowed down. The Presentation Time from the presentation clock 360 is passed to the task manager 330 which uses it to calculate "Application Time" and application "Page Time."

Application Time is the time elapsed since an application started (or enters an "Active" state as described in more detail below). When multiple applications are in runtime, each application has a notion of its own Application Time. For each application, Application Time always starts at zero when an application is started in the environment.

For example, if an application App1 starts at Presentation Time of 20 arbitrary time units (which is 0 time units for App1) and application App2 starts at Presentation Time of 25 time units (which is 0 time units for App2), then at Presentation Time of 35 time units, App1's Application Time is 15 time units and App2's Application Time is 10 time units. For applications that are logically subdivided into pages, the Page Time is the time elapsed since a page of an application has been loaded.

Figure 4:
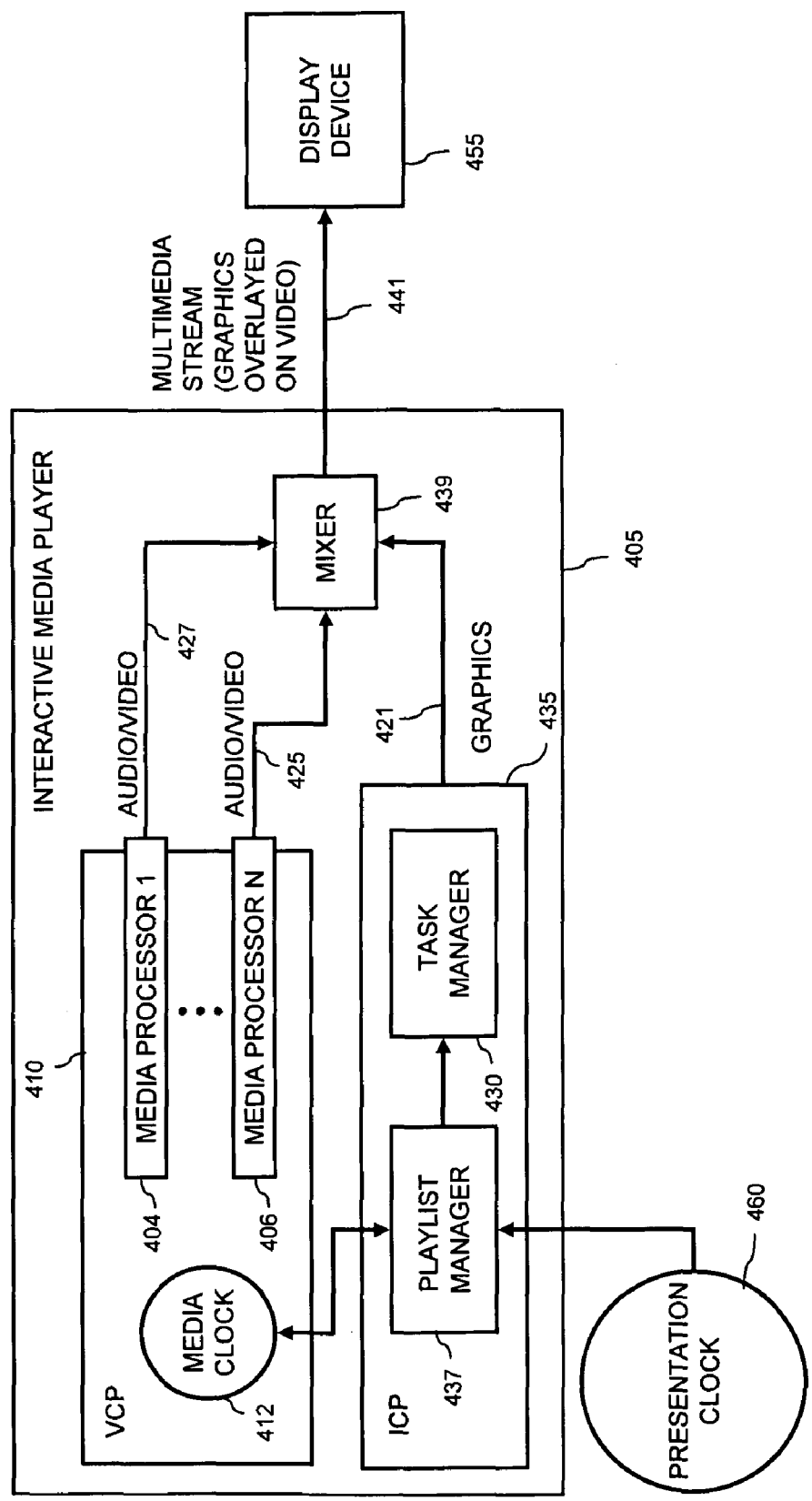
FIG. 4 is a block diagram of a second illustrative interactive media player.

FIG. 4 is a block diagram of a second illustrative media player 405 including an ICP 435, VCP 410, and mixer 439. Interactive media player 405 is similar in form and function to the interactive media player 305 shown in FIG. 3. Notably, however, VCP 435 includes media processors, 1, 2 ... N (as indicated by elements 404 and 406 in FIG. 4) that are arranged to provide separate feeds 425 and 427 to mixer 439. Such arrangement may be desirable in some settings where manipulation of the individual media streams is performed prior to mixing. For example, image processing/selection techniques such panning and zooming of video in a media stream may be independently implemented on one or more of the N separate feeds represented by reference numerals 425 and 427 in FIG. 4.

The audio/video feeds 425 and 427, along with the synchronous graphics stream from ICP 435 are mixed in mixer 439 and output on line 441 to a display device 455. The other elements in FIG. 4 including ICP 435 (comprising playlist manager 437 and task manager 430), media clock 412 in VCP 410 and presentation clock 460 are configured and function in a similar manner as their counterparts shown in FIG. 3 and described in the accompanying text.

Figure 5:
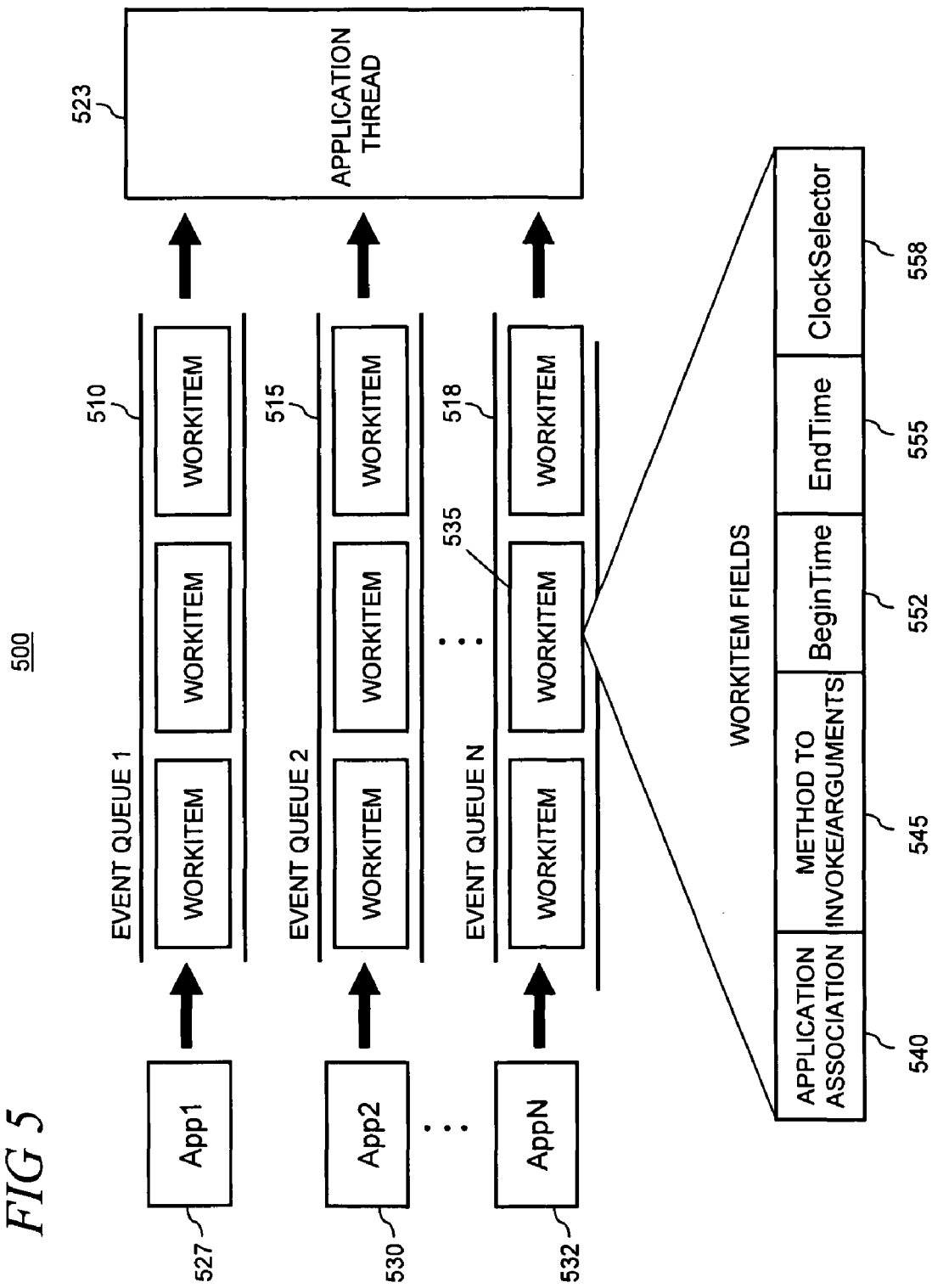
FIG. 5 is a block diagram of an illustrative arrangement having a plurality of event queues and a single application thread.

FIG. 5 is a block diagram of an illustrative arrangement 500 having with a plurality of event queues 1, 2 ... N as designated by reference numerals 510, 515, and 518, respectively, and a single application thread 523. In this illustrative arrangement, all applications running on an ICP (such as ICP 435 in FIG. 4) are single threaded, and application thread 523 is dedicated for such purpose. However, ICP 435 does not necessarily need to be single threaded itself. In alternative implementations, ICP 435 may utilize other threads, for example for pre-fetching resources into a cache.

Each of the event queues 510, 515, and 518 are arranged to feed into application thread 523 from their head ends (located at the right side of FIG. 5). A plurality of applications App1, App2 ... AppN as designated by reference numerals 527, 530 and 532, respectively, are arranged to post workitems, representatively designated by reference numeral 535, into the queues 510, 515 and 518 from their tail ends (on the left side of FIG. 5).

Application events are events which are fired by an application. These may include events fired by either script (e.g., script host 115 in FIG. 1) or by markup (e.g., markup 120 in FIG. 1). Application events, in most scenarios, are handled only by script. However, applications 527, 530 and 532 do not invoke script or markup functionality directly. Instead, all such functionality is posted to the applications' respective event queues in the form of workitems and are invoked when the application thread 523 processes the workitem.

In alternative arrangements, events from sources other than applications are also scheduled using event queues. For example, user events are fired by user interaction with a remote control. System events are events fired by the interactive media player such as player 405 shown in FIG. 4 and described in the accompanying text.

Each workitem in events queues 510, 515 and 518 contains fields as shown in FIG. 5. These fields include an application association field 540, a method field 545, a BeginTime field 552, an EndTime field 555, and an optional ClockSelector field 558.

The application association field 540 indicates the particular application to which a workitem applies. The method field 545 contains a method that is invoked when the workitem is processed by the application thread 523. Method field 545 also includes arguments for the method.

The BeginTime field 552 and EndTime field 555 are used, respectively, to indicate when the workitem's method begins and ends. In this illustrative example, time is expressed using Application Time. However, in alternative examples, the BeginTime field 552 and EndTime field 555 contain values which may be alternatively expressed in Title Time, Application Time or Page Time depending on the requirements of a particular setting. In such cases, the particular timeframe used by a workitem is indicated in the ClockSelector field 558. Regardless of the timeframe utilized, a BeginTime for a workitem must always be less than the EndTime.

Figure 6:
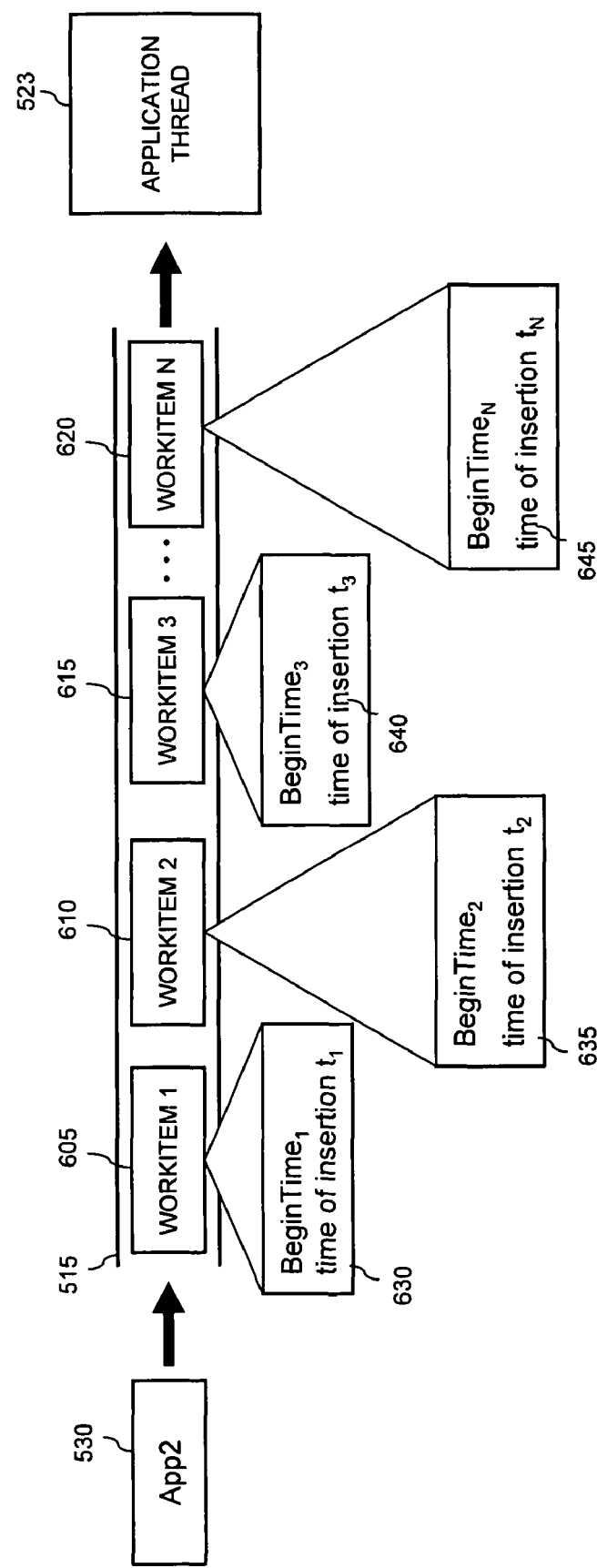
FIG. 6 is a block diagram of an illustrative event queue showing the ordering of workitems first by BeginTime, and then by the time in which workitems were inserted into the event queue.

FIG. 6 is a block diagram of event queue 515 showing the ordering of workitems contained therein. The other event queues 510 and 518 (FIG. 5) are not shown in FIG. 6 for ease of clarity in illustration. However, the ordering methodology described below is equally applicable to such other event queues.

Event queue 515 includes workitems 1, 2, 3 ... N as indicated by reference numerals 605, 610, 615 and 620, respectively. Each workitem includes the fields shown in FIG. 5 and described in the accompanying text.

Workitem 605 includes a $BeginTime_1$ and an associated time of insertion $t_1$ into the event queue 515, as indicated in block 630 in FIG. 6. Similarly, workitem 610 includes a $BeginTime_2$ and an associated time of insertion $t_2$ into the event queue 515 as indicated in block 635. Workitem 615 includes a $BeginTime_3$ and an associated time of insertion $t_3$ into the event queue 515 as indicated in block 640. And, workitem 620 includes a $BeginTime_N$ and an associated time of insertion $t_N$ into the event queue 515, as indicated in block 645.

In this illustrative example, workitems are ordered in the event queue 515 first by BeginTime and then by the time in which workitems were inserted into the event queue. Such ordering results in the application thread 523 processing workitems in order of BeginTime, or when two workitems have the same begin time, then in FIFO (first in, first out) order.

Thus, as workitem 620 is at the head of event queue 515 the implication is that $BeginTime_N < BeginTime_3$; or if $BeginTime_N = BeginTime3$, then $t_N < t_3$ (i.e., workitem 620 was inserted into event queue 515 before workitem 615. Following this same reasoning for workitems 605, 610 and 615, then:

$BeginTime_3 < BeginTime_2$;
  or if $BeginTime_3 = BeginTime_2$, then $t_3 < t_2$; and
$BeginTime_2 < BeginTime_1$;
  or if $BeginTime_2 = BeginTime_1$, then $t_2 < t_1$ The ordering of workitems in an event queue is performed using two alternative methods: workitems may be ordered when inserted into an event queue or when workitems are extracted from the event queue prior to processing. Either arrangement is equally usable so long as the processing of workitems from the event queue is performed by BeginTime followed by queue insertion time.

Figure 7:
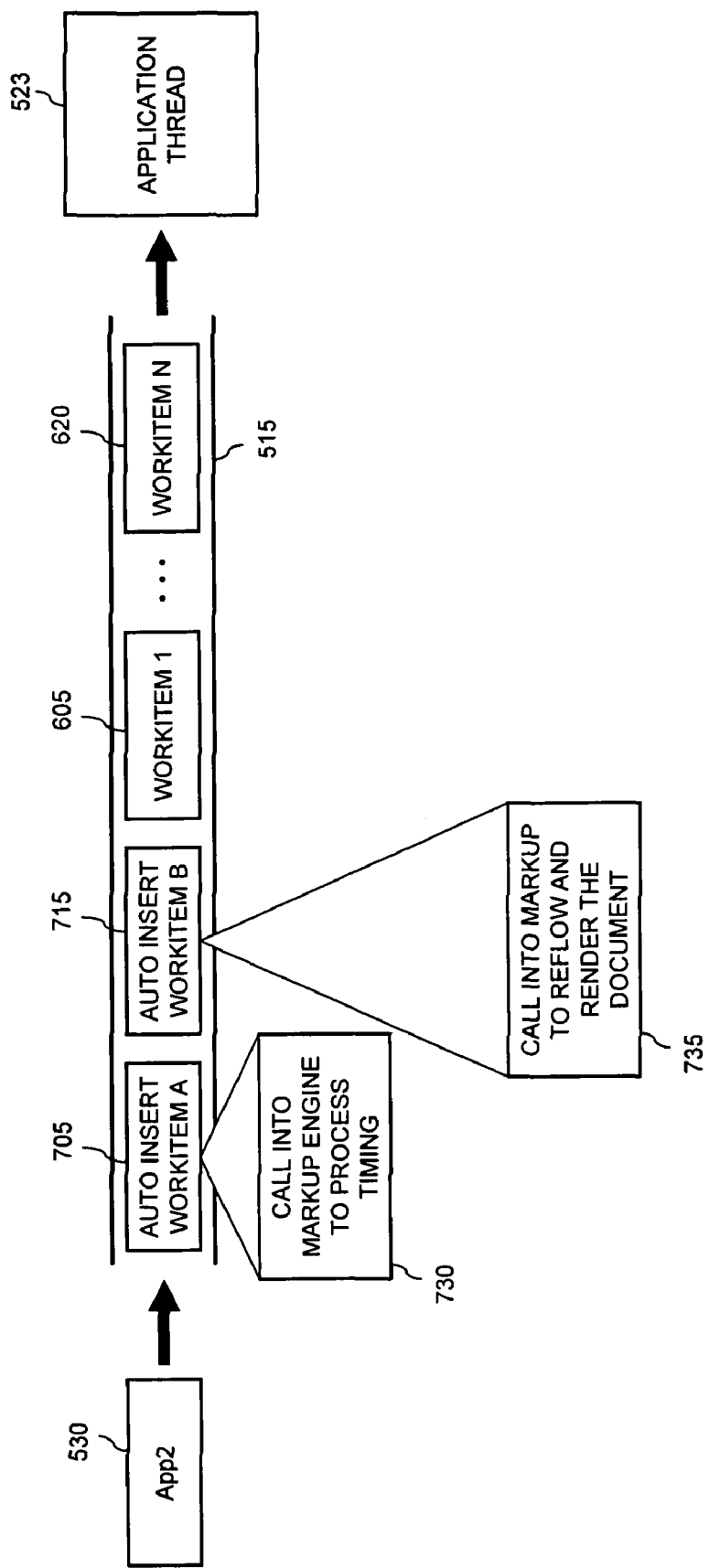
FIG. 7 is a block diagram of an illustrative arrangement where the application thread automatically inserts two workitems at the end of the event queue.

FIG. 7 is a block diagram of an illustrative arrangement where the application thread 523 automatically inserts two workitems 705 and 715 at the tail end of the event queue 515. The other event queues 510 and 518 (FIG. 5) are not shown in FIG. 7 for ease of clarity in illustration. However, the automatic insertion of workitems by the application thread as described below is equally applicable to such other event queues. As shown, the automatically inserted workitems 705 and 715 follow after workitems 605 and 620 in the event queue 515. In an illustrative example, the automatic insertion of the two workitems is performed when an application starts and the workitems are rescheduled after each tick.

Workitem 705 includes calls into the markup engine (e,g, a markup engine disposed in ICP 435 in FIG. 4) to process timing for a page in application App2 530 as indicated in block 730. In block 735, workitem 715 includes calls into the markup to reflow application App2's markup to reflect processed events and then render the markup on the display device (e.g., display 455 in FIG. 4). Workitems 705 and 715 are always the last workitems processed in an application's tick by application thread 523.

Figure 8:
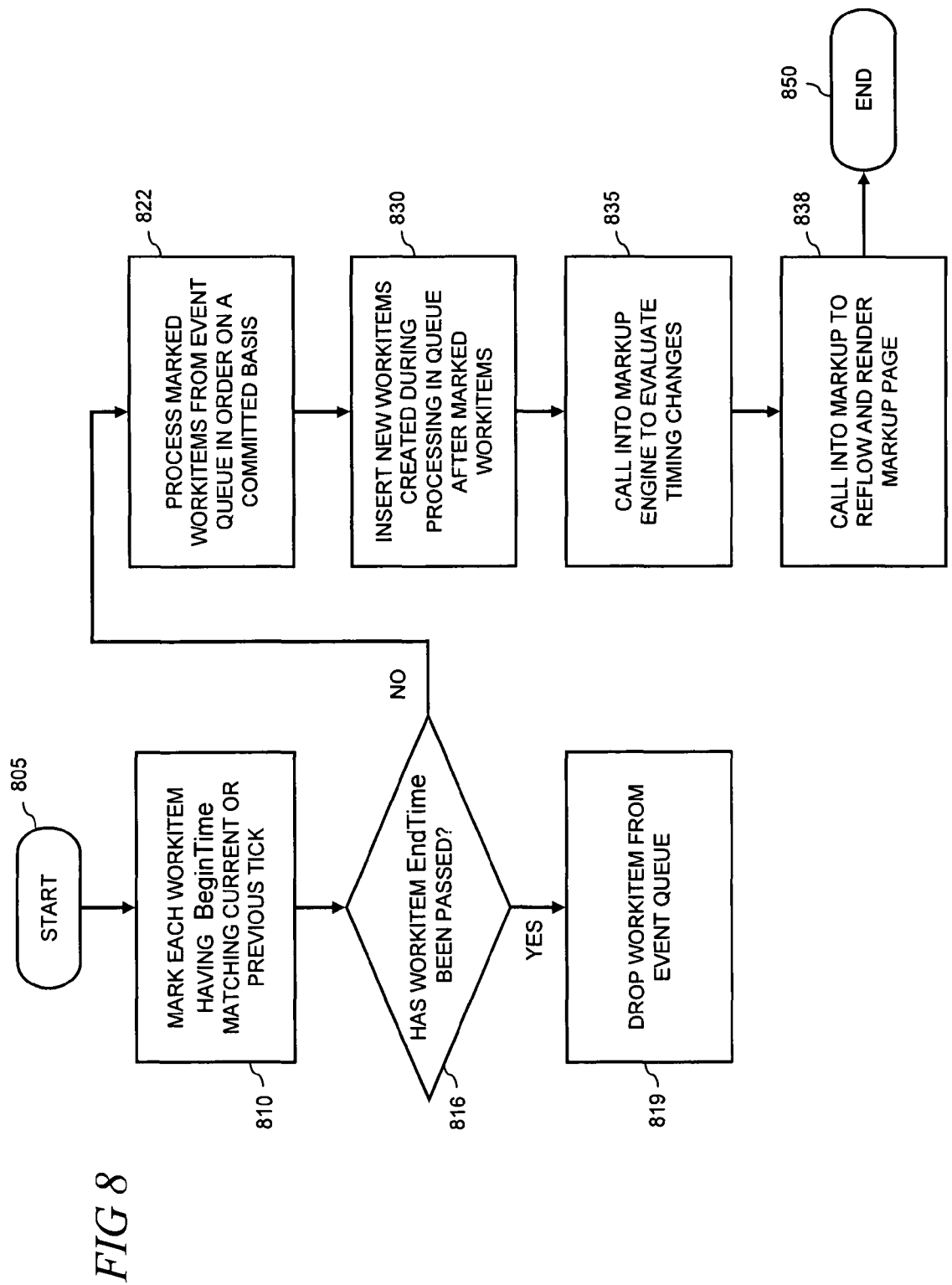
FIG. 8 is a flow chart of an illustrative method for queuing workitems associated with events that occur in an interactive media environment.

FIG. 8 is a flow chart of a method for queuing workitems associated with events that occur in an interactive media environment. In an illustrative example of event queuing with a single application thread, the method is performed by the arrangements shown in FIGS. 4-7 and described in the accompanying text. The method shown is typically performed iteratively for each tick.

The process starts at block 805. At block 810, when the application thread 523 (FIGS. 5-7) is free to process workitems, it first marks each workitem in the event queue 515 whose BeginTime corresponds to the current or previous ticks. Application thread 523 will only process marked workitems. Thus a workitem in event queue 515 will never be processed before its BeginTime.

At decision block 816, if a marked workitem's EndTime has already been passed then it is dropped from event queue 515 as indicated in block 819. No processing on that workitem will be performed in such a case. Should application App2 530 reloads its page, the application's page clock is reset to zero and all outstanding (i.e., queued) workitems based on the application's page clock are dropped from event queue just as if they had reached their EndTime.

If at decision block 816 a marked workitem's EndTime has not been passed, then control is passed to block 822 and the application thread 523 processes the workitem. As noted above in the description accompanying FIG. 6, each workitem is processed in order from the event queue 515: first by BeginTime, followed by the time each workitem was inserted into the event queue 515.

Both repetitive events and one-shot (i.e., single occurrence, non-repetitive) events are managed using the method shown in FIG. 8. A repetitive event may include a periodic event where the associated workitem has an EndTime that is equal to the next scheduled BeginTime. That is, each periodic event has a duration equal to the event's period.

Periodic events typically include events like timer events and application drawing events. For example, if an application's script (e.g., in script host 115 in FIG. 1) creates a timer that will call back once every 10 seconds, it will add a timer workitem to the event queue 515 with a BeginTime equal to the current time plus 10 seconds. The EndTime will be set to the BeginTime plus 10 seconds. Once the timer workitem is executed out of the event queue 515, the BeginTimes and EndTimes will be adjusted by adding another 10 seconds and the workitem will be reinserted into the event queue 515 at the proper location based on the new BeginTime.

Periodic events are invoked whenever possible. But if they cannot be processed by the application thread 523 before the EndTime in their associated workitems expires, then that particular invocation is dropped and the next invocation is scheduled with a new workitem. Thus, periodic events are subject to workitem timeout.

Advantageously, the event queuing method enables a parameter may be passed to timer events to indicate the time that the event is to be invoked. This parameter must be the same as the BeginTime in the associated workitem. Script associated with a periodic timer event might not be run exactly at the invoked time, as noted above. However, as each workitem includes a method field 545 (FIG. 5) that specifies arguments to the method, the argument's value will reflect an intended time of invocation and not the actual time. Accordingly, the handler for a timer event will know what time (i.e., tick) it is handling.

A one-shot event has a corresponding workitem with an EndTime of INFINITE. Therefore, a one-shot event will never be dropped from the event queue 515. For example, if a one-shot event is an input event, then that event's handler is scheduled as a workitem in the event queue 515 with an EndTime of INFINITE.

As indicated in block 822, the processing is performed on a committed basis. That is, once the application thread 523 begins processing a workitem from the event queue 515, it does not stop processing. For example, script which may be long running is not aborted nor are exceptions injected into the script in order to throw it out. While such a scheme can tie up the application thread while it processes script, as noted above the ICP (e.g., ICP 435 in FIG. 4) may be arranged to include other threads which continue to run during the committed processing of workitems.

At block 830, any new workitems that are created during the processing of marked workitems are inserted into the event queue 515 after the marked workitems, regardless of their BeginTime. The process of marking workitems, committing to them and inserting new workitems after the committed workitems in an event queue (as shown in blocks 810, 822 and 830) ensures that the applications are always afforded some visible progress.

As indicated at block 835 and 828 in FIG. 8, the application thread automatically inserts two workitems into each application's event queue for each tick, as shown in FIG. 7 and described in the accompanying text. These workitems call into the markup engine for each application to evaluate application timing and then reflow and render the markup on a display device. As noted above, the workitems are inserted upon application start and a rescheduled after each tick. In addition, the two workitems are always the last two to be processed for an application's tick and are treated as periodic events that may be dropped from the event queue 515.

Figure 9:
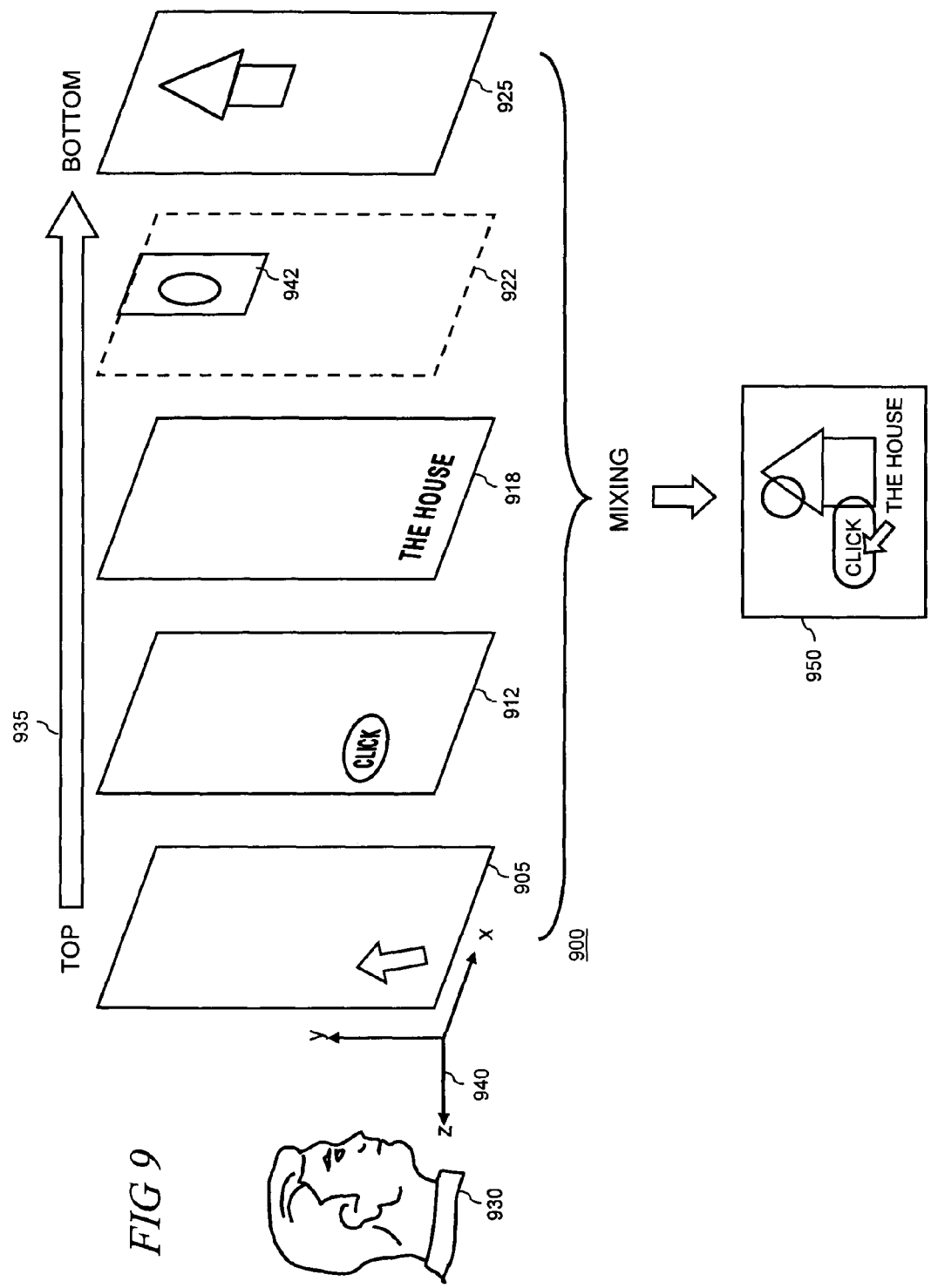
FIG. 9 is a diagram of a set of planes used in an illustrative graphical compositing model.

FIG. 9 is a diagram of a set of graphics planes 900 used in an illustrative graphical compositing model to logically group visual elements on a display by function and/or source. The graphics plane set 900 includes a cursor plane 905, a graphics plane 912, a subpicture plane 918, a subvideo plane 922 and a main video plane 925. The cursor plane 905 is the topmost plane (i.e., perceived by user 930 as closest) in the graphics plane set 900 in which cursor objects like pointers are displayed. The remaining planes are arranged from the top of the display to the bottom, from left to right, as indicated by arrow 935 in FIG. 9.

All planes in the graphics plane set 900 use a common xy coordinate system called a canvas. A third dimension is described by a z axis which projects outwardly from the display as indicated by reference numeral 940 in FIG. 9. Applications running in an interactive media environment belong to specific planes. Applications cannot be explicitly or arbitrarily assigned to planes—the association is made implicitly from the type of application. For example, subtitle applications render in the subpicture plane 918 while most other applications render in the graphics plane 912.

The graphics plane 912 is the second plane of the graphics plane set 900 and is generated by the presentation engine as described below. As noted above, applications that generate interactive content such as graphics and menus in an interactive media environment are typically rendered into the graphics plane 912.

The subpicture plane 918 is the third plane of graphics plane set 900 and is typically used to display subtitles and/or captions produced by respective applications. The subvideo plane 922 is the fourth plane in graphics plane set 900 and is typically used as a secondary video display in a "picture-in-picture" (PIP) arrangement. A PIP window, like that indicated by reference numeral 942 is often smaller than the main video display and may have other differing characteristics such as reduced resolution, different aspect ratio, etc.

The main video plane 925 is the fifth plane in the graphics plane set 900 and is positioned at the bottom of the stack of planes. The main video plane 925 is typically used to display video content in the interactive media environment including video titles as described above in the description accompanying FIG. 3. As shown in FIG. 9, all the planes in graphics plane set 900 are mixed and composited into a single display 950 by a graphics rendering engine as described below.

Figure 10:
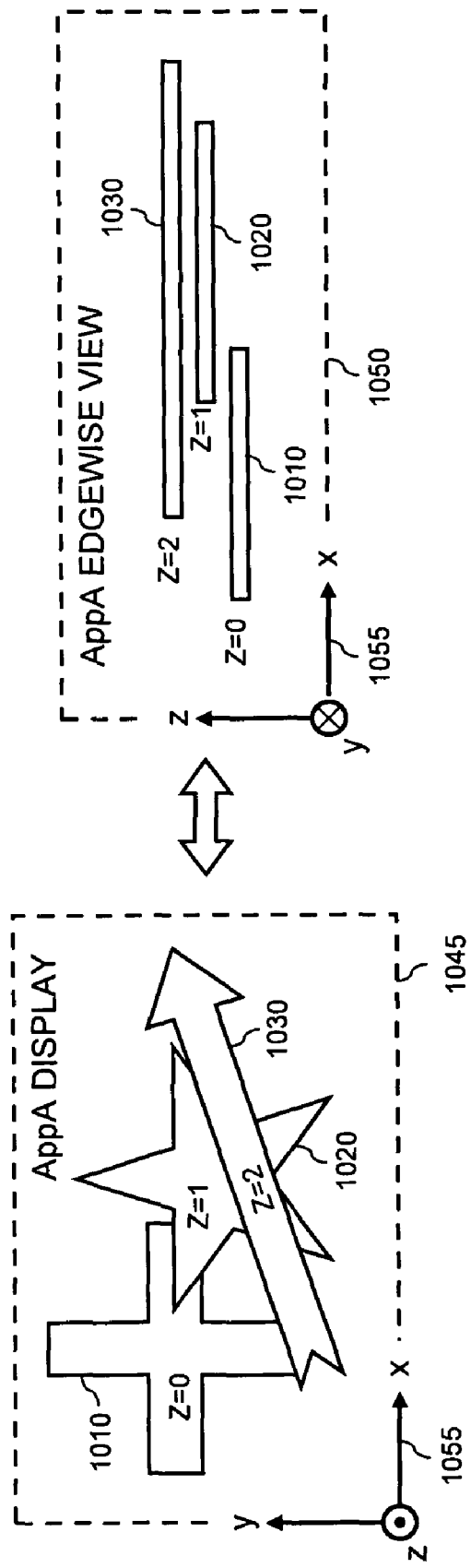
FIG. 10 is a diagram showing Z order of visual elements within a first illustrative application.

FIG. 10 is a diagram showing Z order of three visual elements within a first illustrative application called AppA. It is emphasized that the Z order within an application is different than the Z order of the application. That is, an application generates visual elements that have a Z order within the application and, the application is itself Z ordered among a plurality of applications that are running on an ICP (such as ICP 435 in FIG. 4).

Application AppA generates three visual elements including element 1010 (cross), element 1020 (star) and element 1030 (arrow) with Z order of 0, 1 and 2, respectively that are in a stacked arrangement as shown. Thus, for a set of N elements, a set of Z order values starts at 0 for the lowest element in the stack and ends at N−1 for the highest element in the stack. Elements 1010, 1020 and 1030 are drawn on a display 1045. Window 1050 in FIG. 10 shows the Z order of the visual elements produced by AppA as if looking at the display 1045 "edgewise." Display 1045 and window 1050 are oriented with respect to each other as indicated by xyz coordinates 1055.

Figure 11:
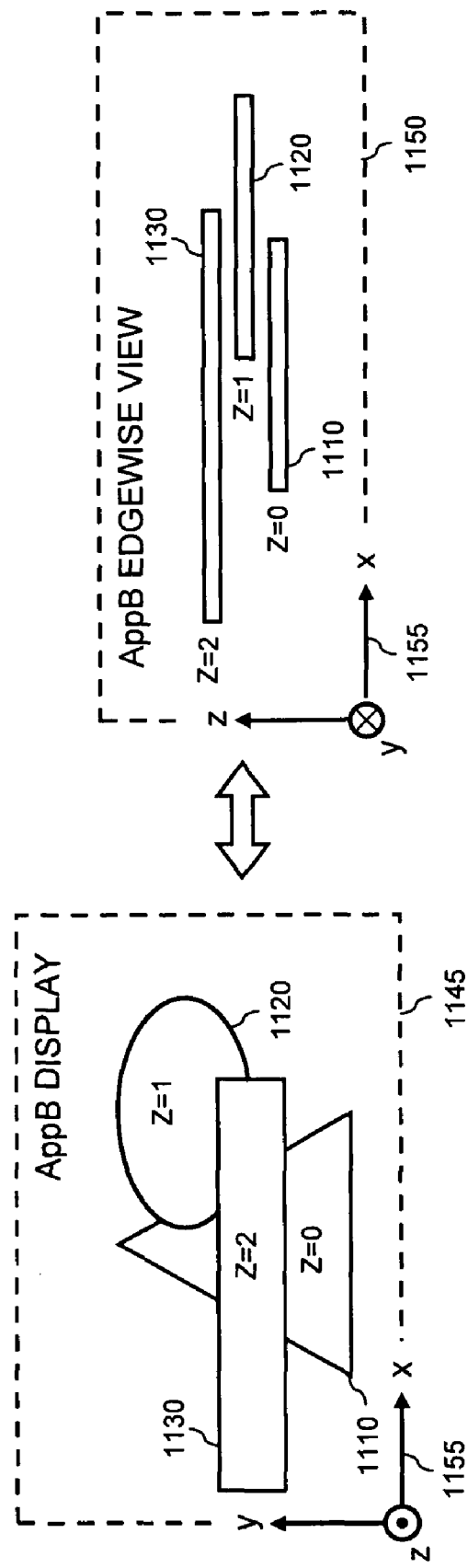
FIG. 11 is a diagram showing Z order of visual elements within a second illustrative application.

FIG. 11 is a diagram showing Z order of visual elements within a second illustrative application called AppB. Application AppB generates three visual elements including element 1110 (triangle), element 1020 (oval) and element 1030 (rectangle) with Z order of 0, 1 and 2, respectively that are in a stacked arrangement on display 1145. Window 1150 shows the Z order of the visual elements produced by AppB in an edgewise view of display 1145 as indicated by xyz coordinates 1155.

Figure 12:
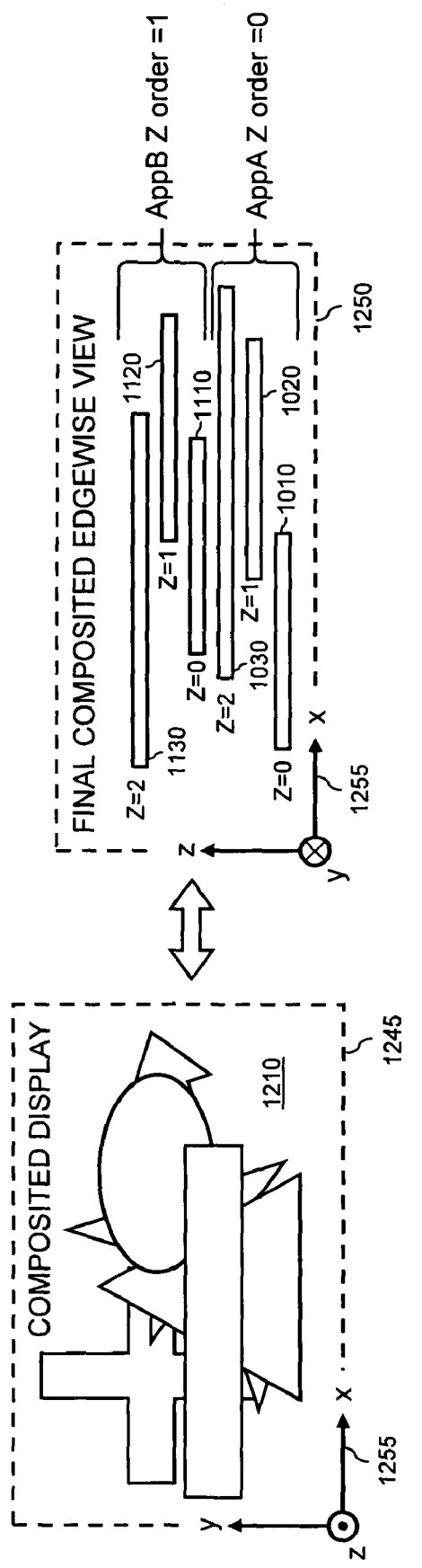
FIG. 12 is a diagram showing a composited display having visual elements generated from the applications shown in FIGS. 10 and 11.

FIG. 12 is a diagram showing a composited display 1245 having visual elements (collectively indicated by reference numeral 1210) that are generated from the both applications AppA and AppB. Window 1250 provides an edgewise view of display 1245 (as indicated by xyz coordinates 1255) and shows that applications AppA and AppB have a relative Z order with respect to each other. In addition, applications AppA and AppB each generate visual elements for which Z order is maintained within the application, as shown in FIGS. 10 and 11 and described in the accompanying text.

Figure 13:
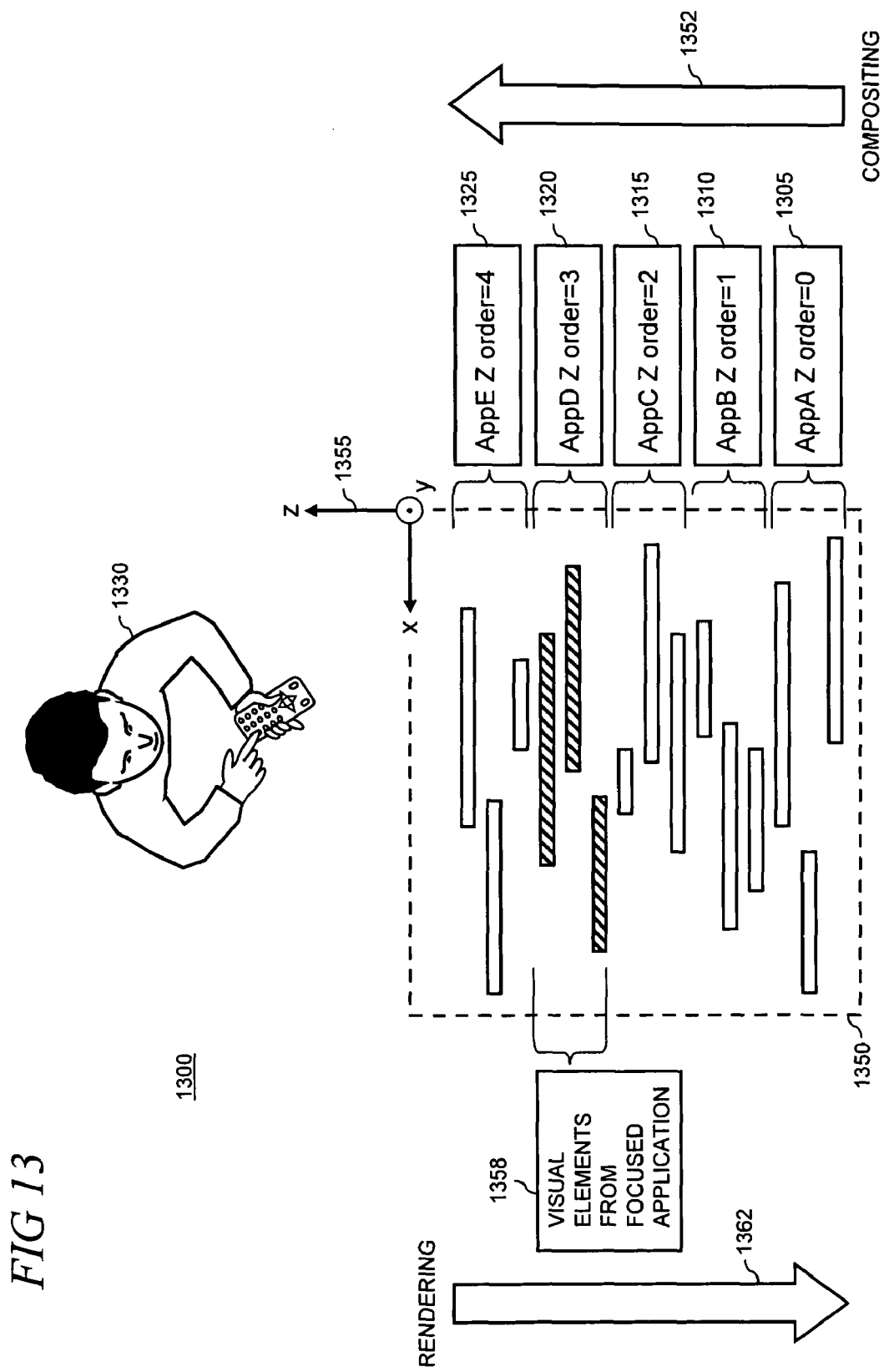
FIG. 13 is a diagram showing an illustrative arrangement where applications are rendered in priority order and composited in bottoms up order.

FIG. 13 is a diagram showing an illustrative arrangement 1300 where applications are rendered in priority order and composited in bottoms up order. Arrangement 1300 includes an edgewise view 1350 of a display that is oriented towards a user 1330 as indicated by xyz coordinates 1355. In other illustrative arrangements (not shown in FIG. 13), the rendering is performed in bottoms up (i.e., Z order responsively to the requirements of a particular setting.

Five applications are running in an interactive media environment including AppA, AppB, AppC, AppD and AppE as indicated by reference numerals 1305, 1310, 1315, 1320 and 1325, respectively. The applications are composited bottoms up, in Z order, in window 1350, as indicated by arrow 1352. Compositing starts with application AppA 1305 with a Z order=0 and end with application AppD 1325 with a Z order=4.

In this illustrative example, as shown at the instant in time shown by FIG. 13, application AppC 1320 is the focused application producing visual elements 1358 that receives user events. However, by virtue of running in a dynamic environment, the particular application having focus typically changes over time by design, and all applications can move up and down in Z order typically as a video title progresses (although it is also emphasized that applications are able to change Z order as they run and operate even in cases when the main video is stopped, paused or frozen). In addition, the focused application can be in any position in the stack (i.e, have any Z order). In many scenarios, however, the focused application will be towards the top of the display order so that it can interact with the user 1330 and receive user events such as button pushes, mouse clicks etc. in a manner that is consistent with user expectations.

As indicated by arrow 1362, applications are rendered in priority order starting with the focused application (e.g., application AppD 1320) followed by the remaining applications in top down, or reverse Z order.

Figure 14:
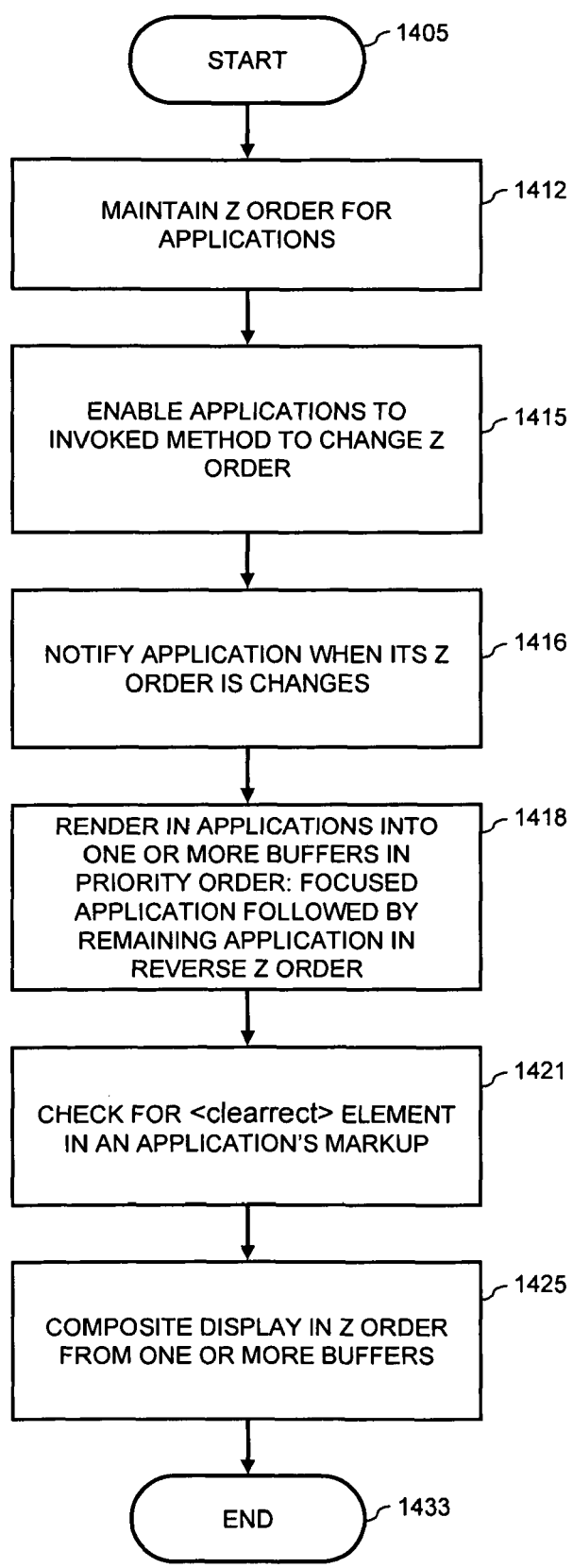
FIG. 14 is a flowchart for an illustrative method in which applications are rendered in priority order and composited in bottoms up order.

FIG. 14 is a flowchart for an illustrative method in which applications are rendered in priority order and composited in bottoms up order. The method starts at block 1405. At block 1412, the Z order, as described above, is maintained for applications running in an interactive media environment. Initial Z order for applications that are associated with a particular video title is specified by the playlist 290 (FIG. 2) using absolute values (e.g., 1, 2, 5, 7 . . . 87, etc.). These absolute values are immediately converted to a relative Z ordering by sorting all applications based on playlist Z order using playlist lexical ordering to break any ties.

Applications are enabled to invoke methods to manipulate their relative Z ordering as the video title progresses in block 1415. Such methods include, for example: a) moving the application to the top of the Z order within a plane; b) moving the application to the bottom of the Z order within a plane; and c) changing an application's Z order to be immediately above the application above it in the display stack.

As noted above, applications belong to specific planes which places a limit on how far an application can move in Z order through invocation of a Z order manipulation method. For example, calling a method to move a subtitle application to the top will make it the topmost application subtitle application in the subpicture plane 918 (FIG. 9), but visual elements generated therein might still be occluded (i.e., obscured) by visual elements rendered into the graphics plane 912 by applications in that plane. Similarly, calling a method to move a regular interactive application to the bottom will move make it the bottom-most application in the graphics plane 912 but will still leave it above all subtitle applications.

At block 1416, an application receives an event to provide a notification that the application's Z order has changed. Such notification is alternatively arranged to be received when an application transitions to, or away from, the topmost application. Such notification would enable, for example, a game application to pause itself when a menu produced by menu-generating application moves to a position with the highest Z order.

The illustrative method continues at block 1418 where visual elements from applications are rendered into one or more graphics buffers. The rendering is performed in priority order, in most scenarios, which starts with the focused application followed by the remaining applications in reverse Z order from the top of the display downwards. Drawing (i.e., two dimensional "2D" drawing) is handled by drawing into a "canvas" object in the application's markup (e.g., markup 120 in FIG. 1) which is then rendered into the graphics buffer in much the same way as rendering a PNG (Portable Network Graphics) file.

The buffering step is arranged, in the illustrative method shown in FIG. 14, so that applications are rendered by posting workitems corresponding to periodic render events in respective application event queues. Event queues and associated methods that may be used with this arrangement are shown in FIGS. 5-8 and described in the accompanying text.

The posting of workitems means that the rendering of application frames is subject to workitem timeout. Doubled buffering of applications is accordingly performed to accommodate the possibility that new application frames may not always be rendered for each video frame if priority is placed elsewhere in the playback system. In such a case, the most recently available frame will continue to be shown until the new one has been completed.

At block 1421, prior to compositing the display, each application is checked to see if it includes a <clearrect> element in its markup (e.g., markup 120 in FIG. 1). Such element is included to produce an opening (i.e., a "hole") in the graphics produced by the application through which the main video plane 925 may be seen. The <clearrect> element produces a rectangular shaped opening, but other regular geometric shapes, irregular shapes, and other arbitrary shapes are also usable depending on requirements of a specific setting.

Elements such as <clearrect> and other such opening-producing elements are not included in the graphics buffers at such time the applications are rendered in block 1418 of the method. Instead, the holes are cleared in applications with lower Z order than the application with the <clearrect> element during compositing so that the main video plane 925 is seen through the holes in the applications. Since rendering is performed in a prioritized manner, it is not practical to implement the <clearrect> element at the time the applications are rendered into the buffer. If it were so implemented, and a lower priority application did not get immediately updated, then there would be a possibility that a hole could inappropriately appear. This would occur, for example, if Z order changed, or the application with the <clearrect> element terminated while the lower priority application was waiting to be updated while in timeout.

At block 1425, applications are composited from the bottom up, in Z order, as shown in FIG. 12 and described in the accompanying text. In most settings, the simple Painter's Algorithm is useable where each application's markup in rendered into the graphics plane 912 using the most recent buffered frame for each application. In addition, as described above, <clearrect> or other opening-producing elements are implemented during the compositing step. The illustrative method ends at block 1433.

Figure 15:
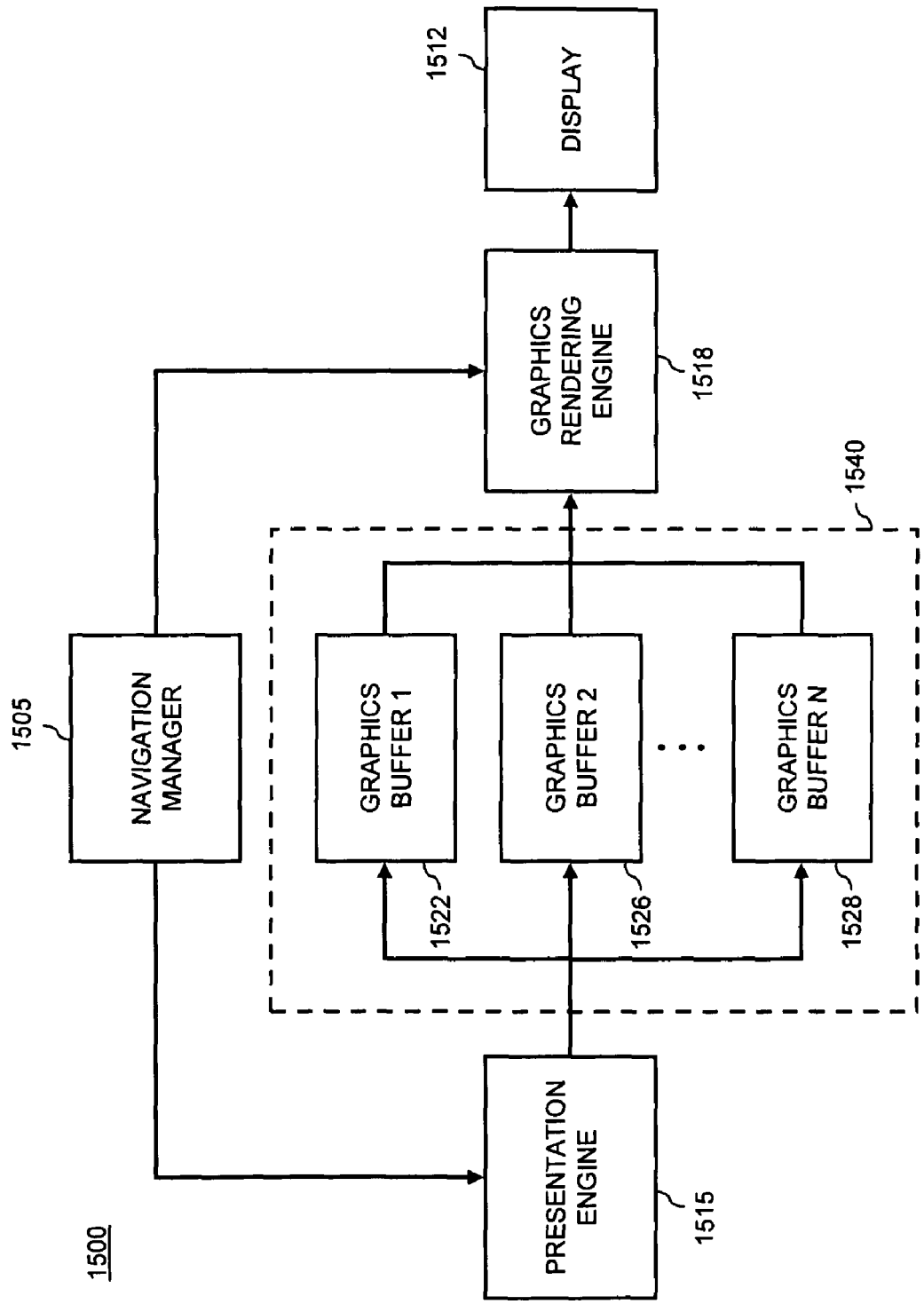
FIG. 15 is a block diagram of an illustrative playback system.

FIG. 15 is a block diagram of an illustrative playback system 1500. A navigation manager 1505 maintains a strict ordering of N applications running in an interactive media environment. Each application is given a Z order from 0 to N−1 and all applications have a unique Z order. There are no gaps in ordering and no two applications have the same Z order. Z order 0 appears at the bottom of display 1512 and Z order N−1 appears at the top. As video titles progress in time, the navigation manager 1505 maintains Z order for the applications in a dynamic fashion from initial Z order values set by the playlist (e.g., playlist 290 in FIG. 2), as described above.

The navigation manager 1505 is coupled to a presentation engine 1515 and a graphics rendering engine 1518. The presentation engine 1515 is arranged, in most settings, to present each of the planes in the graphics plane set 900 to the graphics rendering engine 1518 which performs compositing of the planes and applications therein onto the display 1512.

Disposed between the presentation engine 1515 and the graphics rendering engine 1518 are one or more graphics buffers 1, 2 . . . N as indicated by reference numerals 1522, 1526 and 1528, respectively. The N graphics buffers are arranged to map to respective applications on a one-on-one basis. That is $N_{buffers}=N_{applications}$. In alternative arrangements, a single buffer (indicated by reference numeral 1540) is utilized for all applications, or graphics buffers are mapped to applications on an unequal basis.

It is noted that for the sake of clarity and ease of illustration in the description above that data, programs, and other executable program components such as operating systems are shown is discrete blocks, boxes or other elements although it is recognized and emphasized that such programs and components may reside at various times in different storage, memory or processing components of any hardware host used and are executed by one or more processors in such host hardware.

Although various illustrative arrangements and methods for managing application states in an interactive media environment have been shown and described, it should be understood that the scope of the claims appended hereto shall not necessarily be limited to the specific features, arrangements or methods described. Instead, the specific features, arrangements or methods are disclosed as illustrative forms of implementing managed applications states in an interactive media environment as more particularly claimed below.

The invention claimed is:

1. A method for compositing a display, the method comprising the steps of:

maintaining a Z order for each of a plurality of applications in a stack, each having zero or more script components and zero or more markup files, running in an interactive media environment where the Z order describes a relative order for visual elements on the display, wherein a Z order of visual elements within each of the plurality of applications is distinct from a Z order of the corresponding application within the plurality of applications;

rendering visual elements generated by the applications into respective graphics buffers associated with the applications where the rendering is performed by application starting with visual elements generated by an application having focus by virtue of its receipt of user events, wherein the application having focus may be in any position in the stack, and continuing with visual elements generated by each of the remaining applications in the plurality of applications from highest to lowest Z order of the application wherein during, the rendering of visual elements, new application frames from the applications in some instances are not always rendered for each display frame in response to a workitem timeout and in response to a priority relating to Z order being placed elsewhere in a playback system within the interactive media environment; and compositing the display from the visual elements in the graphics buffers where the compositing is performed by application, for each of the plurality of applications, from lowest to highest Z order.

2. The method of claim 1 where an initial Z order is set in a playlist.

3. The method of claim 1 where the rendering includes using a double buffering arrangement so that rendered elements are double buffered prior to being composited for display.

4. The method of claim 1 where the interactive media environment includes a plurality of display planes and the applications are assigned to render into a graphics plane in the plurality of display planes.

5. The method of claim 1 where the interactive media environment includes a plurality of display planes and the applications are assigned to render into a subpicture plane in the plurality of display planes.

6. The method of claim 1 where the respective graphics buffers are maintained as a single graphics buffer in which visual elements from all applications are rendered.

7. A playback system for connection with a display, the playback system comprising:
   a navigation manager for maintaining a Z order for a plurality of applications in a stack, each application having zero or more script components and zero or more markup files, running in an interactive media environment where the Z order describes the relative order for visual elements on the display, wherein a Z order of visual elements within each of the plurality of applications is distinct from a Z order of the corresponding application within the plurality of applications;
   one or more graphics buffers for buffering visual elements generated by the applications;
   a presentation engine, operatively coupled to the navigation manager, for rendering visual elements by application into the graphics butters in reverse Z order, wherein the rendering is performed by application starting with an application having focus by virtue of its receipt of user events, wherein the application having focus may be in any position in the stack, and continuing with remaining applications in the plurality of application, and wherein during the rendering of visual elements, new application frames from the applications in some instances are not always rendered for each display frame in response to a workitem timeout and in response to a priority relating to Z order being placed elsewhere in the playback system; and
   a graphics rendering engine for compositing frame images for the display from the one or more graphics buffers where the compositing is performed by application, for each of the plurality of applications, in Z order.

8. The playback system of claim 7 where the compositing includes clearing an opening within graphics buffers of all applications with a lower Z order than an application with a clear opening element in its markup so that a video plane may be seen through the opening.

9. The playback system of claim 8 in which the opening has a shape that is selected from one of a plurality of shapes, the shapes including rectangular, circular, oval, and arbitrary shapes.

10. The playback system of claim 7 where composited frame images include an application frame for every video frame.

11. The playback system of claim 10 where the application frame is a most recently available application frame if a new application frame is unavailable.

12. A computer-readable storage medium not consisting of a propagated signal encoded with computer-executable instructions, which when executed by one or more processors in an electronic device, perform a method for setting drawing order for a plurality of N applications in a stack, each application having zero or more script components and zero or more markup files and each of the applications in the plurality being renderable as a visual element on a display in an interactive media environment, the method comprising the steps of:
   enabling an application to invoke one or more methods for manipulating a Z order of the application on the display where the Z order describes the relative order for the N applications on the display, and values of Z order are selected from a set bounded by 0 and N−1, and wherein a Z order of visual elements within each of the plurality of applications is distinct from a Z order of the corresponding application within the plurality of applications;
   rendering visual elements generated by the applications into respective graphics butters associated with the applications where the rendering is performed by application in reverse Z order starting at N−1 and ending at 0, wherein the application N−1 is the application having focus, by virtue of its receipt of user events, wherein the application haying focus may be in any position in the stack, and wherein during the rendering of visual elements, new application frames from the applications in some instances are not always rendered for each display frame in response to a workitem timeout and in response to a priority relating to Z order being placed elsewhere in a playback system within the interactive media environment; and
   compositing the display from the visual elements in the graphics buffers, where the compositing is performed by application, for each of the plurality of applications, in Z order.

13. The computer-readable storage medium not consisting of a propagated signal of claim 12 where the rendering is performed using one or more work items that are inserted into an event queue.

14. The computer-readable storage medium not consisting of a propagated signal of claim 12 further including the step of supplying a notification to an application when its Z order changes.

15. The computer-readable storage medium not consisting of a propagated signal of claim 12 where the rendering comprises drawing into a canvas object in an application's markup.

16. The computer-readable storage medium not consisting of a propagated signal of claim 15 where the canvas object is rendered into the application's respective graphics buffer.

17. The computer-readable storage medium not consisting of a propagated signal of claim 12 further including the step of compositing the display from the most recent buffer using a painter's algorithm.

18. The computer-readable storage medium not consisting of a propagated signal of claim 12 where the method for invoking includes moving an application to a highest Z order.

19. The computer-readable storage medium not consisting of a propagated signal of claim 12 where the method for invoking includes moving an application to a lowest Z order.

20. The computer-readable storage medium not consisting of a propagated signal of claim 12 where the method for invoking includes moving an application to a position immediately above an application having one higher Z order than the moving application.

* * * * *